US012791799B2

(12) United States Patent
Haji et al.

(10) Patent No.: US 12,791,799 B2
(45) Date of Patent: Nov. 10, 2026

(54) OPTICAL FIBER HOLDING COMPONENT, OPTICAL FIBER COUPLING STRUCTURE, OPTICAL CONNECTOR, AND OPTICAL COUPLING STRUCTURE

(71) Applicant: SUMITOMO ELECTRIC INDUSTRIES, LTD., Osaka (JP)

(72) Inventors: Kohei Haji, Osaka (JP); Tetsu Morishima, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 267 days.

(21) Appl. No.: 18/850,444

(22) PCT Filed: Mar. 1, 2023

(86) PCT No.: PCT/JP2023/007528
§ 371 (c)(1),
(2) Date: Sep. 24, 2024

(87) PCT Pub. No.: WO2023/199632
PCT Pub. Date: Oct. 19, 2023

(65) Prior Publication Data

US 2025/0216616 A1 Jul. 3, 2025

(30) Foreign Application Priority Data

Apr. 12, 2022 (JP) ................................ 2022-065801

(51) Int. Cl.
*G02B 6/38* (2006.01)
*G02B 6/02* (2006.01)
*G02B 6/024* (2006.01)

(52) U.S. Cl.
CPC ......... *G02B 6/3835* (2013.01); *G02B 6/3826* (2013.01); *G02B 6/3861* (2013.01);
(Continued)

(58) Field of Classification Search
CPC .. G02B 6/02042; G02B 6/024; G02B 6/3834; G02B 6/3835; G02B 6/3861; G02B 6/3867; G02B 6/3885
See application file for complete search history.

(56) References Cited

U.S. PATENT DOCUMENTS

2009/0097801 A1* 4/2009 Nishimura .......... G02B 6/3835
385/78
2017/0139154 A1 5/2017 Tong et al.
(Continued)

FOREIGN PATENT DOCUMENTS

JP S57-192509 U 12/1982
JP H05-323154 A 12/1993
(Continued)

*Primary Examiner* — Michael Stahl
(74) *Attorney, Agent, or Firm* — Oliff PLC

(57) ABSTRACT

An optical fiber holding component includes a first end surface and a second end surface that face each other in a first direction, a plurality of through holes into each of which a corresponding one of the plurality of optical fibers is insertable, the plurality of through holes extending between the first end surface and the second end surface through the optical fiber holding component in the first direction and being arranged side by side in a second direction intersecting the first direction, and a plurality of injection holes into which an adhesive configured to bond the plurality of optical fibers to the plurality of through holes is injectable, the plurality of injection holes extending in a direction intersecting the plurality of through holes and each being individually connected to a corresponding one of the plurality of through holes.

23 Claims, 21 Drawing Sheets

(52) U.S. Cl.
CPC ........ *G02B 6/3885* (2013.01); *G02B 6/02042* (2013.01); *G02B 6/024* (2013.01)

(56) References Cited

U.S. PATENT DOCUMENTS

| | | | | |
|---|---|---|---|---|
| 2017/0168247 | A1 | 6/2017 | Watanabe et al. | |
| 2019/0196117 | A1 | 6/2019 | Ohmura et al. | |
| 2019/0331865 | A1 | 10/2019 | Morishima | |
| 2020/0088954 | A1* | 3/2020 | Nakama | G02B 6/40 |
| 2021/0271034 | A1 | 9/2021 | Morishima | |
| 2022/0229245 | A1* | 7/2022 | Kanno | G02B 6/3861 |
| 2023/0324627 | A1* | 10/2023 | Fujihara | G02B 6/3839 385/83 |
| 2026/0140330 | A1* | 5/2026 | Haji | G02B 6/3861 |

FOREIGN PATENT DOCUMENTS

| | | | | |
|---|---|---|---|---|
| JP | 8-234057 | A | * | 9/1996 |
| JP | 9-133840 | A | * | 5/1997 |
| JP | 2002-023018 | A | | 1/2002 |
| JP | 2008-046433 | A | | 2/2008 |
| WO | 2016/031678 | A1 | | 3/2016 |
| WO | 2018/055930 | A1 | | 3/2018 |
| WO | 2018/135368 | A1 | | 7/2018 |

* cited by examiner

OPTICAL FIBER HOLDING COMPONENT, OPTICAL FIBER COUPLING STRUCTURE, OPTICAL CONNECTOR, AND OPTICAL COUPLING STRUCTURE

TECHNICAL FIELD

The present disclosure relates to an optical fiber holding component, an optical fiber coupling structure, an optical connector, and an optical coupling structure. This application claims priority based on Japanese Patent Application No. 2022-065801 filed on Apr. 12, 2022, and the entire contents of the Japanese patent application are incorporated herein by reference.

BACKGROUND ART

Patent literature 1 discloses an optical fiber holding component for holding a plurality of optical fibers. The optical fiber holding component has a plurality of V-grooves supporting the plurality of optical fibers, respectively. Each optical fiber is rotationally aligned in each V-groove, and then bonded and fixed to each V-groove in a state of being covered with a lid from above. The optical fiber holding component is accommodated in a ferrule and constitutes an optical connector.

CITATION LIST

Patent Literature

Patent literature 1: WO 2018/135368

SUMMARY OF INVENTION

An optical fiber holding component according to an embodiment of the present disclosure is an optical fiber holding component configured to be disposed in a ferrule and hold a plurality of optical fibers. The optical fiber holding component includes a first end surface and a second end surface that face each other in a first direction, a plurality of through holes into each of which a corresponding one of the plurality of optical fibers is insertable, the plurality of through holes extending between the first end surface and the second end surface through the optical fiber holding component in the first direction and being arranged side by side in a second direction intersecting the first direction, and a plurality of injection holes into which an adhesive configured to bond the plurality of optical fibers to the plurality of through holes is injectable, the plurality of injection holes extending in a direction intersecting the plurality of through holes and each being individually connected to a corresponding one of the plurality of through holes.

DETAILED DESCRIPTION

Figure 1:
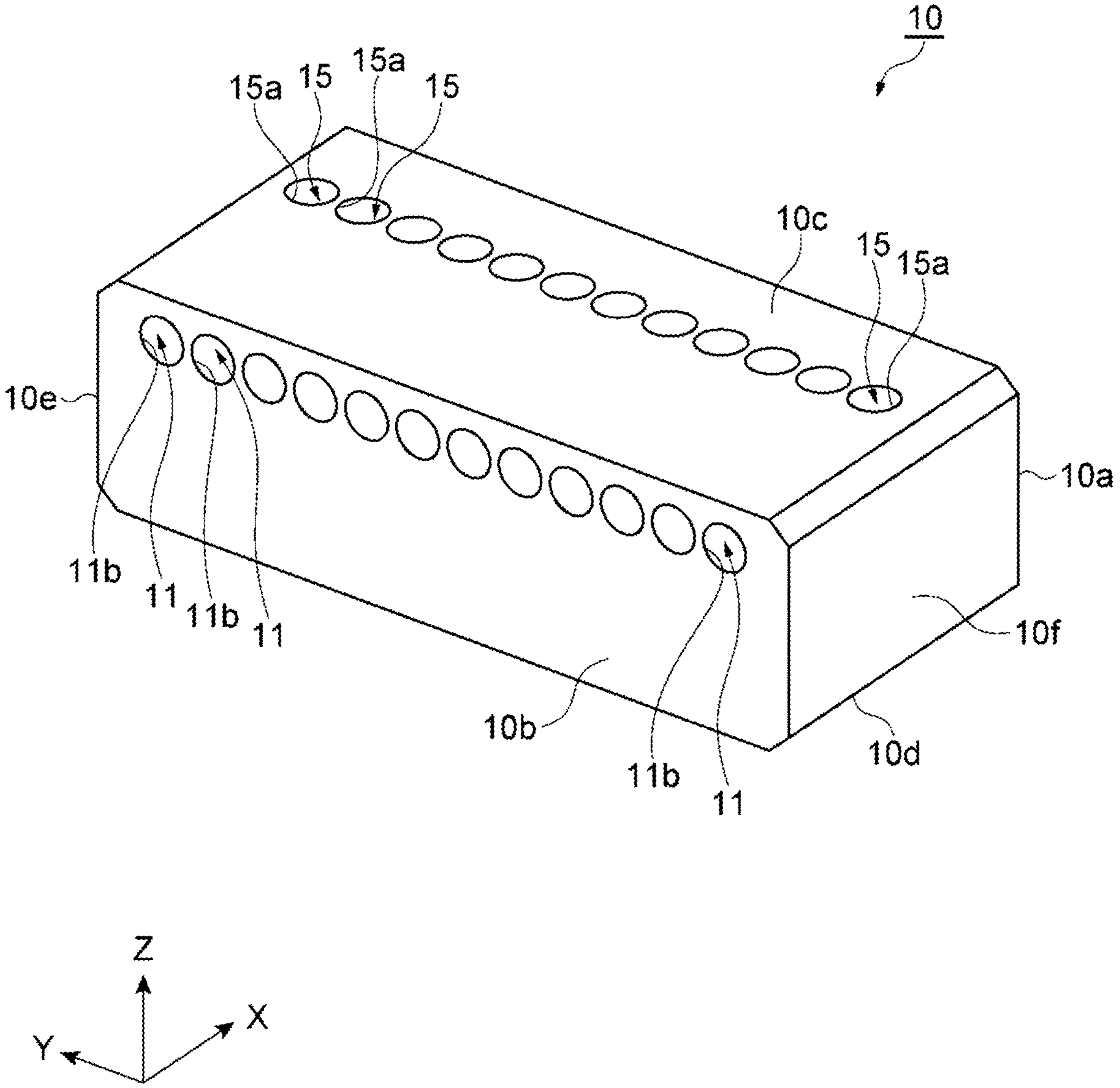
FIG. 1 is a perspective view of an optical fiber holding component according to a first embodiment.

Problems to be Solved by the Present Disclosure

When the optical fiber holding component holding the optical fibers as described above is manufactured, each optical fiber subjected to the rotational alignment is bonded and fixed to each V-groove in a state of being pressed from above by a lid or the like. However, when the optical fiber receives a pressing force from one direction in this manner, the optical fiber that has been subjected to the rotational alignment may move and rotate in the V-groove. Further, when the optical fiber is insufficiently bonded to the V-groove, the optical fiber is likely to rotate due to an impact or the like that may occur during an assembling process. Thus, the optical fiber holding component as described above has a problem that it is difficult to hold each optical fiber with high accuracy.

The present disclosure provides an optical fiber holding component, an optical fiber coupling structure, an optical connector, and an optical coupling structure that can hold a plurality of optical fibers with high accuracy.

Advantageous Effects of Present Disclosure

According to an optical fiber holding component, an optical fiber coupling structure, an optical connector, and an optical coupling structure according to the present disclosure, a plurality of optical fibers can be held with high accuracy.

DESCRIPTION OF EMBODIMENTS OF PRESENT DISCLOSURE

First, the contents of embodiments of the present disclosure will be listed and explained. (1) An optical fiber holding component according to an embodiment of the present disclosure is an optical fiber holding component configured to be disposed in a ferrule and hold a plurality of optical fibers. The optical fiber holding component includes a first end surface and a second end surface that face each other in a first direction, a plurality of through holes into each of which a corresponding one of the plurality of optical fibers is insertable, the plurality of through holes extending between the first end surface and the second end surface through the optical fiber holding component in the first direction and being arranged side by side in a second direction intersecting the first direction, and a plurality of injection holes into which an adhesive configured to bond the plurality of optical fibers to the plurality of through holes is injectable, the plurality of injection holes extending in a direction intersecting the plurality of through holes and each being individually connected to a corresponding one of the plurality of through holes.

In the optical fiber holding component described above, each optical fiber that is rotationally aligned is inserted into each through hole, and the adhesive is injected into each through hole from each injection hole, whereby each optical fiber is fixed to each through hole. In this configuration where the optical fiber is inserted into the through hole and fixed, unlike the configuration where the optical fiber is placed on the V-groove and fixed, a situation in which the optical fiber moves due to a pressing force from one direction received from a lid or the like does not occur. Further, since the injection hole for injecting the adhesive extends in the direction intersecting the through hole and is individually connected to the through hole, the adhesive can be individually injected into the through hole from a path different from the other through holes. In this case, by adjusting a position of the injection hole with respect to the through hole, an injection amount of the adhesive, and the like in consideration of the fluidity of the adhesive, the adhesive can be reliably filled between the optical fiber and the through hole without a gap, and the adhesive can be evenly distributed around the optical fiber. Thus, the stress generated when the adhesive is cured can be uniformly applied to the optical fiber, and thus, a situation in which the position of the optical fiber changes due to the stress applied in one direction can be suppressed. Further, since the adhesive is evenly distributed around the optical fiber, adhesive strength between the optical fiber and the through hole can be sufficiently maintained, and thus, a situation in which the position of the optical fiber changes due to an impact or the like that may occur during an assembling process can be suppressed. Thus, according to the optical fiber holding component described above, the position of each optical fiber that has been subjected to rotational alignment in each through hole can be maintained, and thus each optical fiber can be held with high accuracy.

(2) In the above (1), the optical fiber holding component may be made of a resin capable of transmitting ultraviolet light. In this configuration, an ultraviolet curable adhesive can be used to fix each optical fiber to each through hole. In this case, by irradiating the adhesive in each through hole with ultraviolet light from an outside of the optical fiber holding component, each optical fiber can be fixed to each through hole in a state where the position of each optical fiber subjected to rotational alignment is maintained. Further, by performing injection molding using resin, the optical fiber holding component can be manufactured inexpensively and with high accuracy.

(3) In the above (1), the optical fiber holding component may be made of quartz glass capable of transmitting ultraviolet light. In this configuration, the ultraviolet curable adhesive can be used to fix each optical fiber to each through hole. In this case, by irradiating the adhesive in each through hole with ultraviolet light from the outside of the optical fiber holding component, each optical fiber can be fixed to each through hole in a state where the position of each optical fiber subjected to rotational alignment is maintained. Further, the optical fiber holding component can be manufactured at low cost and with high accuracy by using the quartz glass having high rigidity and excellent machining quality. Furthermore, since the use of the quartz glass can reduce frictional resistance between an inner surface of each through hole and each optical fiber, operation of rotationally aligning each optical fiber in each through hole can be easily performed.

(4) In any one of the above (1) to (3), each of the plurality of through holes may include a holding part configured to hold a coating-removed portion that is a portion included in the corresponding one of the plurality of optical fibers and from which a coating has been removed. A fixing part configured to fix a coated portion at the fixing part may be provided between the holding part and the second end surface in the first direction, the coated portion being another portion included in the corresponding one of the plurality of optical fibers and on which a coating remains. In this case, when each optical fiber is assembled to the optical fiber holding component, the coating-removed portion of each optical fiber is held by the holding part, and the coated portion of each optical fiber is fixed to the fixing part. In this way, with the configuration in which the coated portion of each optical fiber is fixed to the fixing part, even when bending occurs in a rear portion of the coated portion that is not fixed to the fixing part, the stress due to the bending can be made difficult to be transmitted to the coating-removed portion having a relatively low strength. This can suppress a situation in which each optical fiber is damaged by bending.

(5) In the above (4), the holding part may be configured to hold the coating-removed portion to be rotatable around a central axis of the coating-removed portion. In this case, by performing rotational alignment of the coating-removed portion of each optical fiber in the holding part of each through hole, the position of each optical fiber in the rotational direction with respect to the optical fiber holding component can be determined.

(6) In the above (4) or (5), the holding part may include a constant diameter portion capable of holding the coating-removed portion and having a constant inner diameter, and an increased-diameter portion positioned between the constant diameter portion and the fixing part in the first direction and having an inner diameter increasing from the constant diameter portion toward the fixing part in the first direction. In this case, the coating-removed portion of each optical fiber can be easily inserted from the increased-diameter portion to the constant diameter portion of each through hole.

(7) In any one of the above (4) to (6), the fixing part may be a plurality of fixing holes into each of which the coated portion of a corresponding one of the plurality of optical fibers is individually insertable. The plurality of fixing holes may be each individually connected to the holding part of a corresponding one of the plurality of through holes in the first direction. In this case, since the coated portion of each optical fiber can be inserted into each fixing hole and fixed more reliably, it is possible to make it more difficult for bending stress to be transmitted to the coating-removed portion of each optical fiber.

(8) In any one of the above (4) to (6), the fixing part may be a fixing hole configured to collectively accommodate the coated portions of the plurality of optical fibers. The fixing hole may be connected to the holding part of each of the plurality of through holes in the first direction. In this case, the coated portion of each optical fiber can be easily inserted into the fixing hole.

(9) In any one of the above (4) to (6), the optical fiber holding component may further include a first side surface and a second side surface facing each other with the plurality of through holes interposed between the first side surface and the second side surface in a third direction intersecting both the first direction and the second direction. The first side surface may have a plurality of openings at each of which a corresponding one of the plurality of injection holes is open. The fixing part may be a fixing surface configured to allow the coated portion of each of the plurality of optical fibers to be placed on the fixing surface. The fixing surface may be disposed at a position between the plurality of through holes and the second side surface in the third direction. In this case, the coating-removed portion of each optical fiber can be inserted into the holding part of each through hole while the coated portion of each optical fiber is placed along the fixing surface, and thus insertion work of the coating-removed portion into the holding part is facilitated. Further, since the coated portion of each optical fiber is placed along the fixing surface, the position of the coating-removed portion with respect to the holding part can be stabilized, and thus it is possible to suppress a situation in which bending stress is generated in the coating-removed portion when the coating-removed portion is inserted into the holding part.

(10) In any one of the above (4) to (8), the optical fiber holding component may further include a first side surface intersecting a third direction intersecting both the first direction and the second direction. Each of the plurality of injection holes may extend through the optical fiber holding component from the first side surface to the holding part in the third direction. In this case, the adhesive injected into each injection hole from the first side surface can be more reliably spread to the holding part of each through hole, and the coating-removed portion can be more reliably fixed to the holding part with the adhesive. This makes it possible to more reliably maintain the position of each optical fiber that has been subjected to rotational alignment in each through hole.

(11) In the above (9), each of the plurality of injection holes may extend through the optical fiber holding component from the first side surface to the holding part in the third direction. In this case, the adhesive injected into each injection hole from the first side surface can be more reliably spread to the holding part of each through hole, and the coating-removed portion can be more reliably fixed to the holding part with the adhesive. This makes it possible to more reliably maintain the position of each optical fiber that has been subjected to rotational alignment in each through hole.

(12) In any one of the above (1) to (8), the optical fiber holding component may further include a first side surface intersecting a third direction intersecting both the first direction and the second direction. The first side surface may have a plurality of openings at each of which a corresponding one of the plurality of injection holes is open. The plurality of openings may include a first opening and a second opening adjacent to each other, the second opening being closest to the first opening. In the first side surface, the second opening may be formed at a position separated from the first opening. When the adhesive is injected into each injection hole from each opening, if the adhesive injected into the injection hole leaks from the opening and is cured in a state of flowing to the opening of another injection hole into which the adhesive has been injected, a bulge may be generated in the vicinity of the opening of said another injection hole. Such a bulge may be a factor of reducing the positional accuracy of the optical fiber holding component with respect to the ferrule. In contrast, in the above-described configuration, the first opening and the second opening are separated from each other, and thus it is possible to suppress a situation in which the adhesive leaking from one of the first opening and the second opening flows to the other and forms a bulge. This can suppress a situation in which the positional accuracy of the optical fiber holding component with respect to the ferrule is reduced.

(13) In any one of the above (9) to (11), the first side surface may have a plurality of openings at each of which a corresponding one of the plurality of injection holes is open. The plurality of openings may include a first opening and a second opening adjacent to each other, the second opening being closest to the first opening. In the first side surface, the second opening may be formed at a position separated from the first opening. When the adhesive is injected into each injection hole from each opening, if the adhesive injected into the injection hole leaks from the opening and is cured in a state of flowing to the opening of another injection hole into which the adhesive has been injected, a bulge may be generated in the vicinity of the opening of said another injection hole. Such a bulge may be a factor of reducing the positional accuracy of the optical fiber holding component with respect to the ferrule. In contrast, in the above-described configuration, the first opening and the second opening are separated from each other, and thus it is possible to suppress a situation in which the adhesive leaking from one of the first opening and the second opening flows to the other and forms a bulge. This can suppress a situation in which the positional accuracy of the optical fiber holding component with respect to the ferrule is reduced.

(14) In the above (12) or (13), the second opening may be shifted from the first opening in the first direction. In this case, the adhesive leaking from one of the first opening and the second opening is less likely to flow into the other, and thus it is possible to more reliably suppress a situation in which the above-described bulge is formed.

(15) In any one of the above (12) to (14), the second opening may be shifted from the first opening in the third direction. In this case, it is possible to more reliably suppress a situation in which the adhesive leaking from one of the first opening and the second opening flows to the other and forms a bulge.

(16) In any one of the above (12) to (15), the first side surface may have a recessed portion between the first opening and the second opening. In this case, even if the adhesive leaks out from one of the first opening and the second opening, the leaking adhesive can be released to the recessed portion between the first opening and the second opening, and thus it is possible to more reliably suppress a situation in which the leaking adhesive flows to the other of the first opening and the second opening and forms a bulge.

(17) In any one of the above (12) to (16), each of the plurality of injection holes may include an increased-diameter portion having an inner diameter increasing toward the first side surface in the third direction. Since each injection hole has such an increased-diameter portion, the adhesive can be made less likely to leak from the opening of each injection hole onto the first side surface. This makes it possible to more reliably suppress a situation in which the adhesive that has leaked from one of the first opening and the second opening flows to the other opening and forms a bulge.

(18) In any one of the above (12) to (17), the first side surface may further have a first groove having the first opening at a bottom surface of the first groove and extending in the first direction, and a second groove having the second opening at a bottom surface of the second groove, the second opening being closest to the first opening, and extending in the first direction, the second groove and the first groove being arranged side by side to be separated from each other in the second direction. The first side surface has such first groove and second groove, whereby the adhesive can be made less likely to leak from the opening of each injection hole onto the first side surface. This makes it possible to more reliably suppress a situation in which the adhesive that has leaked from one of the first opening and the second opening flows to the other opening and forms a bulge.

(19) An optical fiber coupling structure according to an embodiment of the present disclosure includes the optical fiber holding component according to any one of the above (1) to (18), and the plurality of optical fibers each fixed at a corresponding one of the plurality of through holes by a cured product of the adhesive. Since the optical fiber coupling structure includes any one of the optical fiber holding components described above, it is possible to hold each optical fiber with high accuracy as described above.

(20) In the above (19), each of the plurality of optical fibers may include at least one core in a region shifted from a central axis. In this case, the position of each optical fiber in the rotational direction with respect to the optical fiber holding component can be determined by performing rotational alignment of each optical fiber in each through hole.

(21) An optical connector according to an embodiment of the present disclosure includes the optical fiber coupling structure according to (19) or (20), and the ferrule configured to accommodate at least a portion of the optical fiber coupling structure. The ferrule has an accommodating hole configured to accommodate the optical fiber holding component, and a plurality of fiber holding holes in communication with the accommodating hole in the first direction and each configured to hold a corresponding one of the plurality of optical fibers extending from the optical fiber holding component in the first direction. The optical fiber holding component has a first side surface and a second side surface facing each other with the plurality of through holes interposed between the first side surface and the second side surface in a third direction intersecting both the first direction and the second direction, and a third side surface connecting the first side surface and the second side surface to each other and intersecting the second direction. The accommodating hole has a first inner surface in contact with the second side surface and a second inner surface in contact with the third side surface. Since the optical connector includes any one of the optical fiber holding components described above, each optical fiber can be held with high accuracy as described above. Further, the second side surface and the third side surface of the optical fiber holding component are in contact with the first inner surface and the second inner surface of the ferrule, respectively, and thus the position of the optical fiber holding component with respect to the ferrule can be maintained with high accuracy.

(22) The optical connector according to the above (21) may include a first optical fiber coupling structure and a second optical fiber coupling structure as the optical fiber coupling structure. The first optical fiber coupling structure and the second optical fiber coupling structure may be stacked on each other at the accommodating hole in the third direction. In this configuration, even when the plurality of fiber holding holes of the ferrule are arranged in a multi-tiered manner in the third direction, the first optical fiber coupling structure and the second optical fiber coupling structure are stacked on each other in the third direction, and thus the plurality of optical fibers can be arranged so as to correspond to the arrangement of the plurality of fiber holding holes.

(23) An optical coupling structure according to an embodiment of the present disclosure includes a first optical connector and a second optical connector as the optical connector according to the above (21) or (22). The first optical connector and the second optical connector face each other with a gap interposed between the first optical connector and the second optical connector in the first direction. In this way, when the first optical connector and the second optical connector are not connected by physical contact (PC), a pressing force for PC connection of the first optical connector and the second optical connector is not required, and thus it is possible to collectively and easily connect more optical fibers.

DETAILS OF EMBODIMENTS OF PRESENT DISCLOSURE

Specific examples of an optical fiber holding component, an optical fiber coupling structure, an optical connector, and an optical coupling structure according to embodiments of the present disclosure will be described below with reference to the drawings. The present disclosure is not limited to these examples, but is defined by the scope of the claims, and is intended to include all modifications within the meaning and scope equivalent to the scope of the claims. In the following description, the same elements are denoted by the same reference numerals in the description of the drawings, and redundant description will be appropriately omitted.

First Embodiment

FIG. 1 is a perspective view of an optical fiber holding component 10 according to a first embodiment. Optical fiber holding component 10 is a component for holding a plurality of optical fibers 20, and is disposed in a ferrule 30 (see FIG. 8). In FIG. 1, an XYZ orthogonal coordinate system is shown for ease of understanding. As shown in FIG. 1, optical fiber holding component 10 has, for example, a rectangular parallelepiped appearance in which a Y-axis positive direction (second direction) is a longer side direction, an X-axis positive direction (first direction) is a shorter side direction, and a Z-axis positive direction (third direction) is a thickness direction. In the following description, the Z-axis positive direction may be referred to as "up", the Z-axis negative direction may be referred to as "down", the X-axis positive direction may be referred to as "front", and the X-axis negative direction may be referred to as "back".

Optical fiber holding component 10 is made of, for example, a resin capable of transmitting ultraviolet light used for curing an adhesive A (see FIG. 4) described later. Optical fiber holding component 10 may be made of, for example, quartz glass capable of transmitting ultraviolet light. The term "capable of transmitting ultraviolet light" means that, for example, the transmittance of a material with a thickness of 3 mm is 40% or more when irradiated with ultraviolet light having a wavelength of 350 nm to 400 nm. When such resin or quartz glass is used as the material of optical fiber holding component 10, optical fiber holding component 10 can be manufactured at low cost and with high accuracy. Optical fiber holding component 10 is not limited to these materials, and may be made of metal. When metal is used as the material of optical fiber holding component 10, high dimensional accuracy can be obtained, and thus optical fiber holding component 10 can be manufactured with higher accuracy. In addition, when optical fiber holding component 10 is made of a material such as quartz glass or metal, frictional resistance between optical fiber holding component 10 and the plurality of optical fibers 20 can be reduced, and thus, in a state where the plurality of optical fibers 20 are arranged in optical fiber holding component 10, the operation of rotational alignment of the plurality of optical fibers 20 can be easily performed.

Optical fiber holding component 10 includes, for example, a front surface 10*a* (first end surface), a back surface 10*b* (second end surface), an upper surface 10*c* (first side surface), a lower surface 10*d* (second side surface), a side surface 10*e* (third side surface), and a side surface 10*f*. Front surface 10*a* is an end surface positioned at a front end (one end) of optical fiber holding component 10 in an X direction. Front surface 10*a* is, for example, a plane along a YZ plane. Back surface 10*b* is an end surface positioned at a back end (the other end) of optical fiber holding component 10 in the X direction, and faces front surface 10*a* in the X direction. Back surface 10*b* is, for example, a plane along the YZ plane. A normal direction of back surface 10*b* coincides with, for example, a normal direction of front surface 10*a*.

Upper surface 10*c* is an end surface positioned at an upper end of optical fiber holding component 10 in a Z direction, and faces upward of optical fiber holding component 10. Upper surface 10*c* is, for example, a plane along an XY plane and connects front surface 10*a* and back surface 10*b*. Lower surface 10*d* is an end surface positioned at a lower end of optical fiber holding component 10 in the Z direction, and faces downward of optical fiber holding component 10. Upper surface 10*c* and lower surface 10*d* are arranged on both sides with a plurality of through holes 11 described later interposed therebetween in the Z direction. Lower surface 10*d* is, for example, a plane along the XY plane, and connects front surface 10*a* and back surface 10*b* at a position facing upper surface 10*c* in the Z direction. A normal direction of lower surface 10*d* coincides with, for example, a normal direction of upper surface 10*c*. The normal directions of upper surface 10*c* and lower surface 10*d* are orthogonal to the normal directions of front surface 10*a* and back surface 10*b*, for example. In this case, upper surface 10*c* and lower surface 10*d* are perpendicular to front surface 10*a* and back surface 10*b*.

Side surface 10*e* is an end surface positioned at one end of optical fiber holding component 10 in a Y direction, and faces one side of optical fiber holding component 10 in the Y direction. Side surface 10*e* is, for example, a plane along an XZ plane, and connects front surface 10*a* and back surface 10*b*. Side surface 10*f* is, for example, an end surface positioned at the other end of optical fiber holding component 10 in the Y direction, and faces the other side of optical fiber holding component 10 in the Y direction. Side surface 10*f* is, for example, a plane along the XZ plane, and connects front surface 10*a* and back surface 10*b* at a position facing side surface 10*e* in the Y direction. A normal direction of side surface 10*f* is, for example, coincides with a normal direction of side surface 10*e*. The normal directions of side surface 10*e* and side surface 10*f* are orthogonal to the normal directions of front surface 10*a* and back surface 10*b* and the normal directions of upper surface 10*c* and lower surface 10*d*, for example. In this case, side surface 10*e* and side surface 10*f* are perpendicular to front surface 10*a*, back surface 10*b*, upper surface 10*c*, and lower surface 10*d*.

Figure 2:
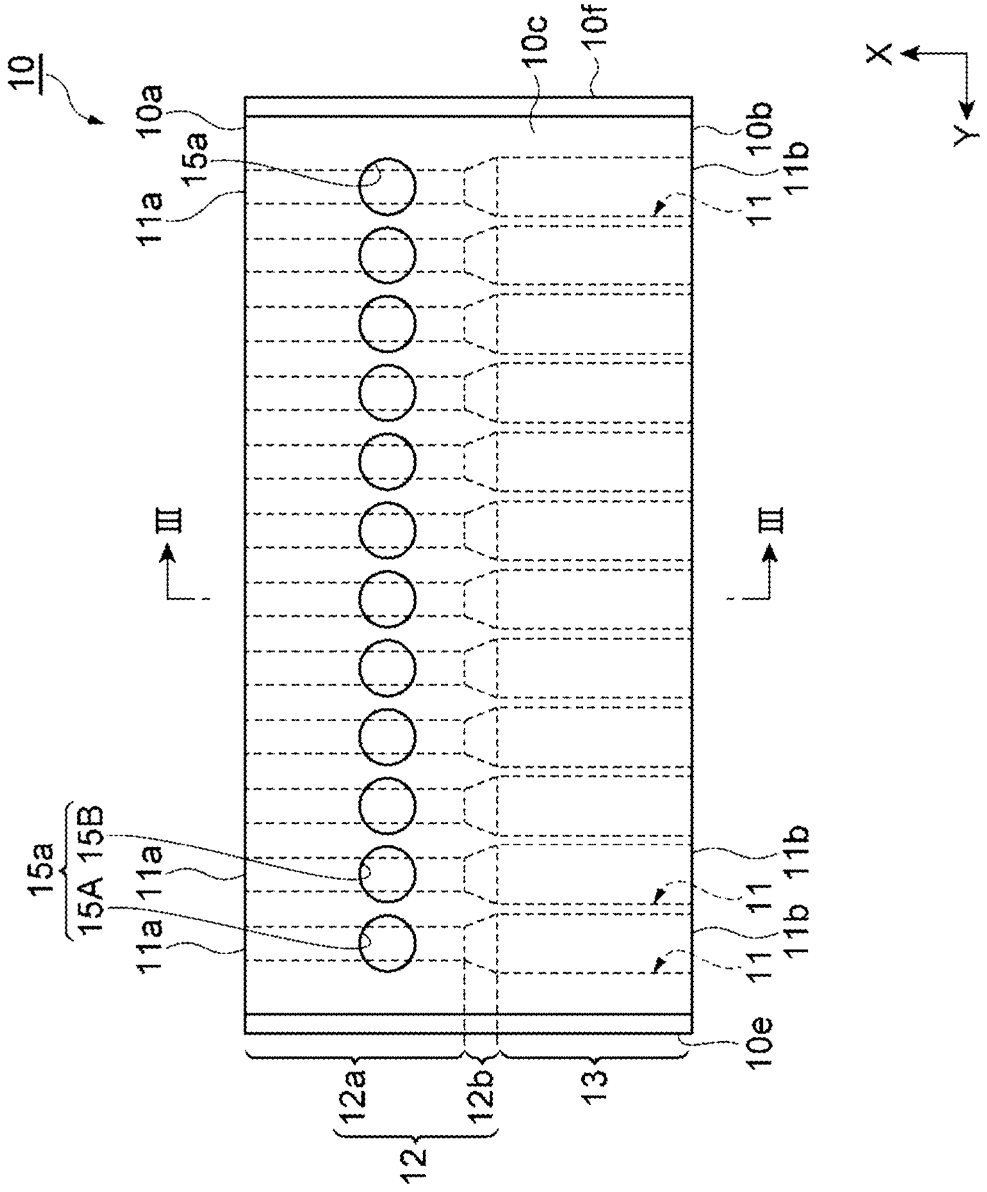
FIG. 2 is a plan view of the optical fiber holding component of FIG. 1.

FIG. 2 is a plan view of optical fiber holding component 10. As shown in FIGS. 1 and 2, optical fiber holding component 10 further includes a plurality of through holes 11 for holding the plurality of optical fibers 20, respectively (see FIG. 4). Each through hole 11 penetrates optical fiber holding component 10 in the X direction and though holes 11 are arranged in a row in the Y direction. Each through hole 11 is formed, for example, at a position closer to upper surface 10*c* than to lower surface 10*d* in the Z direction. As shown in FIG. 2, each through hole 11, for example, extends linearly along the X direction from front surface 10*a* to back surface 10*b*, and opens at front surface 10*a* and back surface 10*b*. Each through hole 11 has, for example, a circular shape when through hole 11 is viewed in the X direction.

Front surface 10*a* has a plurality of openings 11*a* at each of which a corresponding one of the plurality of through holes 11 is open. Each opening 11*a* corresponds to each through hole 11, and openings 11*a* are arranged in a row in the Y direction. Back surface 10*b* has a plurality of openings 11*b* at each of which a corresponding one of the plurality of through holes 11 is open. Each opening 11*b* corresponds to each through hole 11, and openings 11*b* are arranged in a row in the Y direction. When opening 11*b* is viewed in the X direction, the center of each opening 11*b* coincides with, for example, the center of each opening 11*a*. An inner diameter of each opening 11*b* is, for example, larger than an inner diameter of each opening 11*a*. Although FIGS. 1 and 2 shows a case where twelve through holes 11 are arranged in a row (12 through holes×1 row) at equal intervals in the Y direction, the number of through holes 11 is not limited to 12, and may be another number such as 4, 8, or 16. Through holes 11 do not need to be arranged in one row, and may be arranged in two or more rows (that is, two or more stages in the Z direction).

Figure 3:
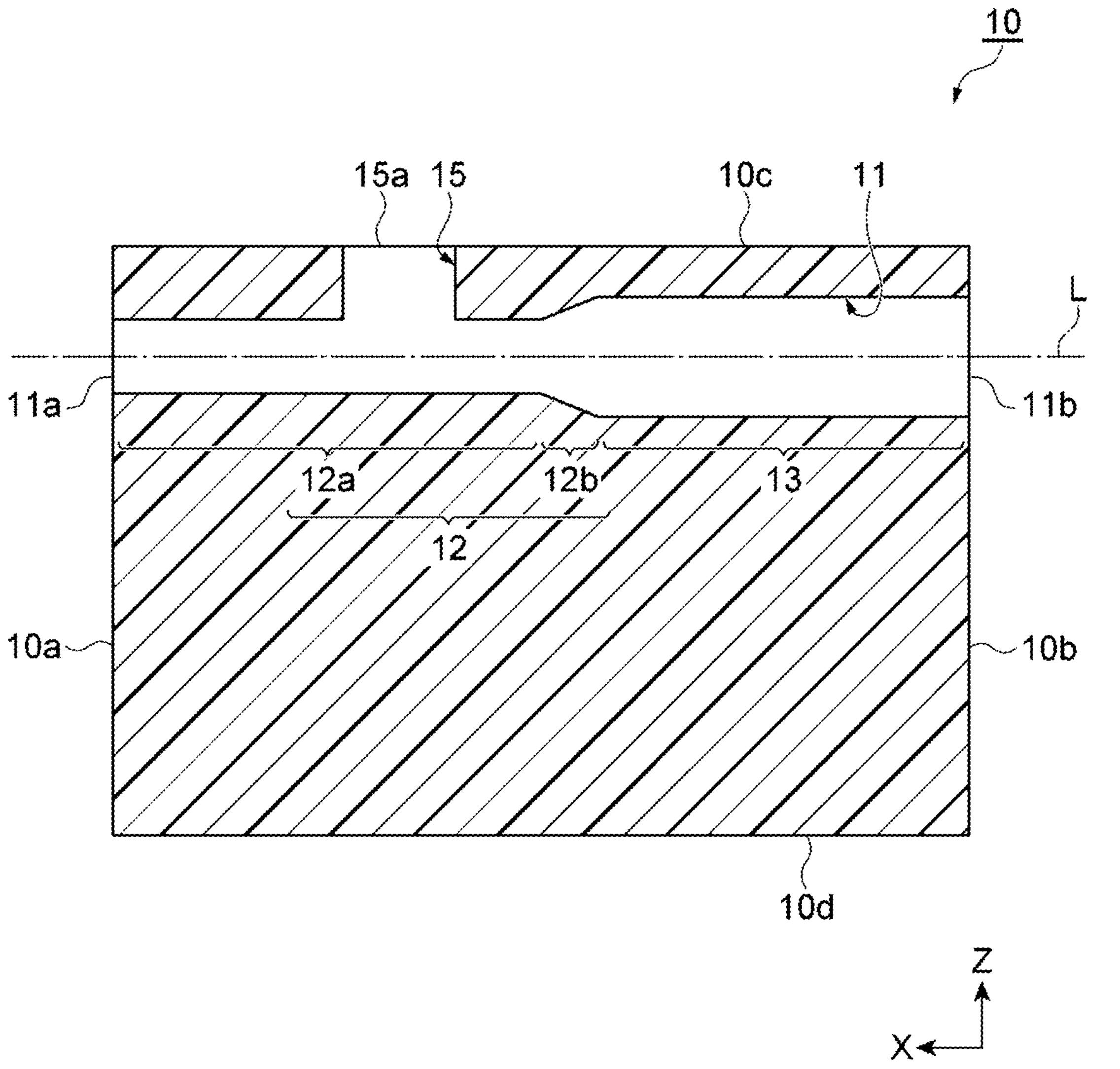
FIG. 3 is a cross-sectional view of the optical fiber holding component taken along line III-III of FIG. 2.

FIG. 3 is a cross-sectional view of optical fiber holding component 10 taken along line III-III of FIG. 2. As shown in FIG. 3, each of the plurality of through holes 11 has a holding part 12 positioned closer to front surface 10*a* in the X direction and a fixing part 13 positioned between holding part 12 and back surface 10$b$ in the X direction. Holding parts 12 of the plurality of through holes 11 function as a plurality of holding holes for holding respective coating-removed portions 22 (see FIG. 6) of the plurality of optical fibers 20, which will be described later. Each holding part 12 has an inner diameter capable of being inserted a coating-removed portion 22 of each optical fiber 20, and is configured to hold each coating-removed portion 22 rotatable around a central axis L.

Central axis L is an axis passing through the center of coating-removed portion 22 (optical fiber 20) when through hole 11 is viewed in the X direction. Central axis L coincides with an axis passing through the center of holding part 12 when through hole 11 is viewed in the X direction. The term "holding part 12 is configured to hold coating-removed portion 22 rotatable around central axis L" means that an inner diameter of holding part 12 is set to be large enough to allow coating-removed portion 22 to rotate around central axis L and small enough to maintain a position of coating-removed portion 22 in the YZ plane. Each holding part 12 includes a constant diameter portion 12$a$ linearly extending from front surface 10$a$ in the X direction, and an increased-diameter portion 12$b$ provided between constant diameter portion 12$a$ and fixing part 13.

Constant diameter portion 12$a$ is a portion in which the inner diameter is constant at each position along the X direction. In this specification, the expression "the inner diameter is constant" includes both the case where the inner diameter is completely constant and the case where the inner diameter is substantially constant within the range of manufacturing error or the like. The inner diameter of constant diameter portion 12$a$ is set to be larger than an outer diameter of coating-removed portion 22 in consideration of the rotational alignment of optical fiber 20 being performed in through hole 11. On the other hand, if the inner diameter of constant diameter portion 12$a$ is too large, a central axis of a fiber holding hole 33 in ferrule 30 and the central axis of optical fiber 20 do not match (see FIG. 8) when optical fiber holding component 10 is mounted on ferrule 30, and an assembling work becomes difficult. In view of these, for example, when the outer diameter of coating-removed portion 22 is 124 μm to 126 μm, the inner diameter of constant diameter portion 12$a$ may be 126 μm to 156 μm. That is, the inner diameter of constant diameter portion 12$a$ may be equal to or larger than the maximum outer diameter of coating-removed portion 22 and equal to or smaller than the maximum outer diameter of coating-removed portion 22 plus 30 μm. Increased-diameter portion 12$b$ is a portion in which the inner diameter increases from constant diameter portion 12$a$ toward fixing part 13 in the negative X direction. An inner diameter of a connection end of increased-diameter portion 12$b$ to constant diameter portion 12$a$ (i.e., a front end of increased-diameter portion 12$b$ in the X direction) is the same as the inner diameter of constant diameter portion 12$a$, and an inner diameter of a connection end of increased-diameter portion 12$b$ to fixing part 13 (i.e., a back end of increased-diameter portion 12$b$ in the X direction) is the same as an inner diameter of fixing part 13.

Fixing part 13 of each of the plurality of through holes 11 is connected to increased-diameter portion 12$b$ of holding part 12, and extends linearly in the X direction from increased-diameter portion 12$b$ to back surface 10$b$. Fixing parts 13 of the plurality of through holes 11 function as a plurality of fixing holes for holding respective coated portions 23 (see FIG. 6) of the plurality of optical fibers 20. Each fixing part 13 has an inner diameter capable of being inserted coated portion 23 of each optical fiber 20, and is configured to hold each coated portion 23 rotatable around central axis L. That is, the inner diameter of each fixing part 13 is set to be large enough to allow each coated portion 23 to rotate around central axis L and small enough to maintain a position of each coated portion 23 in the YZ plane. Fixing part 13 has, for example, a constant inner diameter at each position along the X direction. The inner diameter of fixing part 13 is set to be larger than an outer diameter of coated portion 23 in consideration of the rotational alignment of optical fiber 20 being performed in through hole 11. On the other hand, if the inner diameter of fixing part 13 is too large, the central axis of fiber holding hole 33 in ferrule 30 and the central axis of optical fiber 20 do not match (see FIG. 8) when optical fiber holding component 10 is assembled to ferrule 30, and the assembling work becomes difficult. In view of these, for example, when the outer diameter of coated portion 23 is 190 μm to 210 μm, the inner diameter of fixing part 13 may be 210 μm to 240 μm. That is, the inner diameter of fixing part 13 may be equal to or larger than the maximum outer diameter of coated portion 23 and equal to or smaller than the maximum outer diameter of coated portion 23 plus 30 μm. As a result, the inner diameter of opening 11$b$ formed in back surface 10$b$ as the opening of fixing part 13 (i.e., the inner diameter of fixing part 13) is larger than the inner diameter of opening 11$a$ formed in front surface 10$a$ as the opening of constant diameter portion 12$a$ (i.e., the inner diameter of constant diameter portion 12$a$). In addition, when a distance between central axes of the two nearest through holes 11 adjacent to each other is 250 μm, a separation distance between the two nearest through holes 11 adjacent to each other at the position of fixing part 13 may be 10 μm to 40 μm.

Optical fiber holding component 10 further includes a plurality of injection holes 15 (resin input holes) for injecting (inputting) adhesive A (see FIG. 4) into the respective through holes 11. As shown in FIGS. 1 and 2, each injection hole 15 is a hole extending in the negative Z direction from upper surface 10$c$, and injection holes 15 are arranged in a row in the Y direction corresponding to respective through holes 11. As shown in FIG. 2, each injection hole 15 has, for example, a circular shape when injection hole 15 is viewed in the Z direction, and is arranged so as to overlap each through hole 11 in the Z direction. Each injection hole 15, for example, linearly extends through optical fiber holding component 10 from upper surface 10$c$ to holding part 12 of each through hole 11 in the Z direction, and is individually connected to holding part 12 of each through hole 11. The term "each injection hole 15 is individually connected to each through hole 11" means that one injection hole 15 is connected to one through hole 11, and that one injection hole 15 is not connected to two or more through holes 11. Thus, each injection hole 15 is provided independently for each through hole 11, and adhesive A injected into one injection hole 15 is introduced only into one through hole 11 connected to the one injection hole 15.

Upper surface 10$c$ has a plurality of openings 15$a$ at each of which a corresponding one of the plurality of injection holes 15 is open. The plurality of openings 15$a$ are disposed, for example, at positions closer to front surface 10$a$ than back surface 10$b$ in the X direction, and are arranged in a row in the Y direction corresponding to the plurality of injection holes 15. A pitch of each opening 15$a$ may be the same as a pitch of each through hole 11, for example. The pitch of each opening 15$a$ is a distance between centers of openings 15$a$ when openings 15$a$ are viewed in the Z direction. The pitch of each through hole 11 is a distance between centers of through holes 11 when through holes 11 are viewed in the X direction. Although FIGS. 1 and 2 show a case where twelve injection holes 15 are arranged in a row in the Y direction corresponding to twelve through holes 11 arranged in a row (12 through holes×1 row) in the Y direction, the number of injection holes 15 may vary depending on the number of through holes 11.

As shown in FIG. 2, the plurality of openings 15*a* include a first opening 15A and a second opening 15B adjacent to each other, and second opening 15B is the closest opening to first opening 15A. Second opening 15B is formed at a position separated from first opening 15A in the Y direction in upper surface 10*c*. Second opening 15B is formed at the same position as first opening 15A in the X direction, for example. That is, second opening 15B is not shifted from first opening 15A in the X direction, and is arranged so as to be linearly aligned with first opening 15A in the Y direction. Further, since upper surface 10*c* where first opening 15A and second opening 15B are formed and lower surface 10*d* which is the opposite side of the upper surface 10*c* are both planes parallel to the XY plane, a height of second opening 15B is the same as a height of first opening 15A when a position of lower surface 10*d* in the Z direction is set as a reference. That is, second opening 15B is formed at the same position as first opening 15A in the Z direction.

As shown in FIG. 3, injection hole 15 extends in the negative Z direction from opening 15*a* in upper surface 10*c* to constant diameter portion 12*a* of through hole 11, for example. An inner diameter of injection hole 15 has a size that allows adhesive A injected from opening 15*a* (see FIG. 4) to be introduced into through hole 11. The term "a size that allows adhesive A to be introduced into through hole 11" means a size that allows liquid adhesive A to flow in injection hole 15 and reach through hole 11. The inner diameter of injection hole 15 is set to be smaller than the pitch of each through hole 11. The inner diameter of injection hole 15 may be, for example, in a range larger than the inner diameter of constant diameter portion 12*a* and smaller than the inner diameter of fixing part 13. The inner diameter of injection hole 15 may be smaller than the inner diameter of constant diameter portion 12*a* or may be larger than the inner diameter of fixing part 13 as long as adhesive A can be introduced into through hole 11. Alternatively, the inner diameter of injection hole 15 may be the same as the inner diameter of constant diameter portion 12*a* or the inner diameter of fixing part 13. The inner diameter of opening 15*a* of upper surface 10*c* formed as the opening of injection hole 15 is the same as the inner diameter of injection hole 15. Thus, the inner diameter of opening 15*a* of upper surface 10*c* may be set to be larger than opening 11*a* of front surface 10*a* and smaller than opening 11*b* of back surface 10*b*, for example. For example, when the minimum value of inner diameter of opening 11*a* is 126 μm and the maximum value of inner diameter of opening 11*b* is 240 μm, the separation distance between first opening 15A and second opening 15B adjacent to each other, second opening 15B being closest to first opening 15A, as shown in FIG. 2, may be 10 μm to 124 μm.

Figure 4:
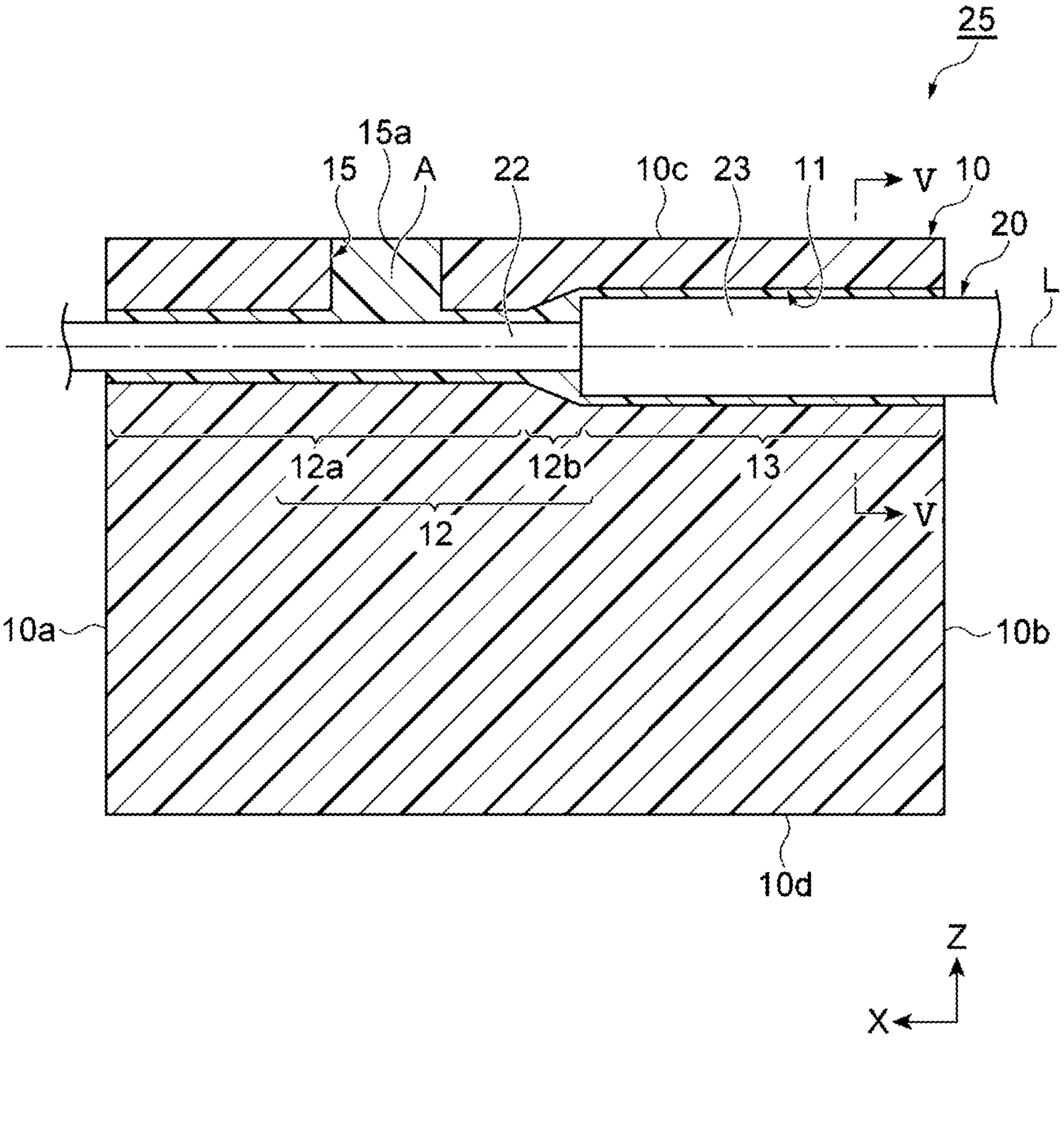
FIG. 4 is a cross-sectional view of an optical fiber coupling structure according to a first embodiment.

FIG. 4 is a cross-sectional view of an optical fiber coupling structure 25 according to the embodiment. Optical fiber coupling structure 25 includes optical fiber holding component 10 described above and a plurality of optical fibers 20. Each optical fiber 20 is, for example, an optical fiber that requires rotational alignment (that is, adjustment of a position around central axis L) in optical fiber holding component 10. Each optical fiber 20 is, for example, a multi-core fiber (MCF). Each optical fiber 20 may be, for example, a polarization maintaining fiber (PMF).

Figure 5:
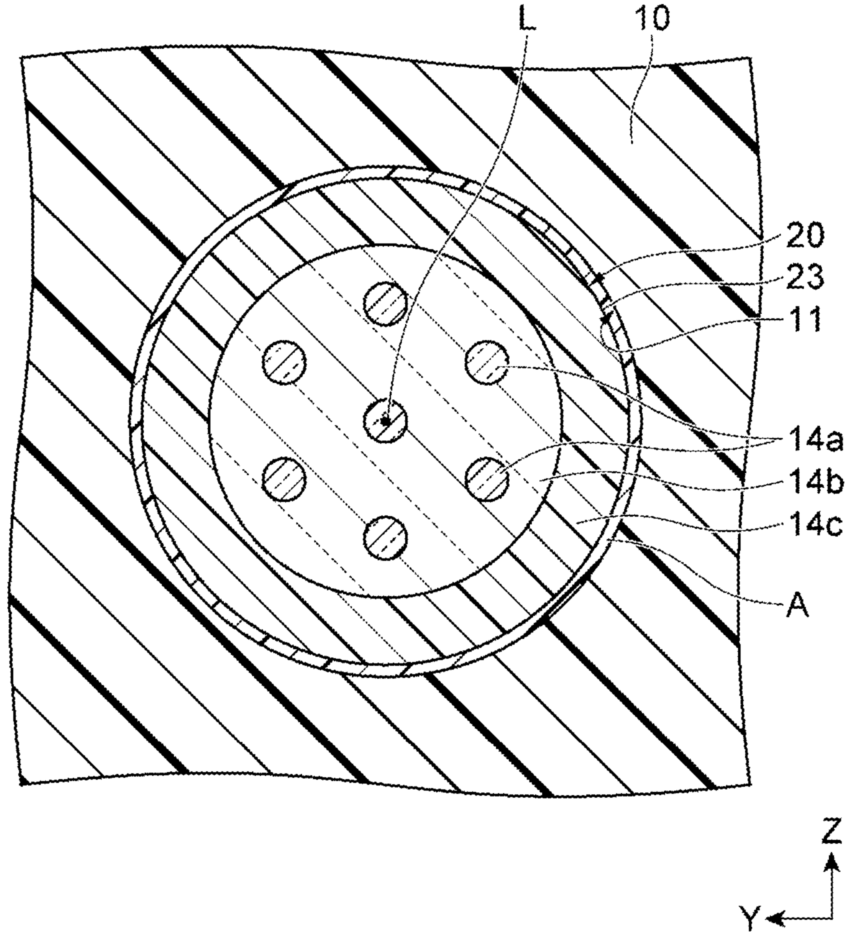
FIG. 5 is a cross-sectional view taken along line V-V of FIG. 4.

FIG. 5 is a cross-sectional view of optical fiber coupling structure 25 taken along line V-V of FIG. 4. As shown in FIG. 5, optical fiber 20 has at least one core 14*a* in a region other than a point on central axis L (i.e., a region shifted from the region on central axis L). In the example shown in FIG. 5, optical fiber 20 has one core 14*a* on central axis L, and further has a plurality of (for example, six) cores 14*a* arranged at equal intervals around central axis L. Optical fiber 20 further includes a cladding 14*b* covering cores 14*a* and a coating 14*c* surrounding cladding 14*b*.

Coated portion 23 of optical fiber 20 is a portion of optical fiber 20 where coating 14*c* remains. Thus, coated portion 23 includes a plurality of cores 14*a*, cladding 14*b*, and coating 14*c*. Coating-removed portion 22 of optical fiber 20 shown in FIG. 4 is a portion of optical fiber 20 where coating 14*c* is removed in a predetermined length from a tip end surface 20*a* (see FIG. 6). Thus, coating-removed portion 22 includes a plurality of cores 14*a* and cladding 14*b*. In coating-removed portion 22, a surface of cladding 14*b* is exposed to the outside. The outer diameter of coated portion 23 is larger than the outer diameter of coating-removed portion 22 by a thickness of coating 14*c*.

As shown in FIG. 4, in a state where optical fiber 20 is inserted into through hole 11, coating-removed portion 22 of optical fiber 20 is disposed in holding part 12 of through hole 11, and coated portion 23 of optical fiber 20 is disposed in fixing part 13 of through hole 11. In this state, adhesive A is injected from injection hole 15 and cured, so that coating-removed portion 22 and coated portion 23 of optical fiber 20 are fixed to holding part 12 and fixing part 13 of through hole 11, respectively. Adhesive A shown in FIG. 4 is, for example, a cured product of an ultraviolet light (UV) curable resin. Adhesive A may be a cured product of a thermosetting resin.

Adhesive A is cured by irradiation of ultraviolet light from an outside of optical fiber holding component 10 in a state where through hole 11 and injection hole 15 are filled with adhesive A, and optical fiber 20 is bonded and fixed to an inner surface of through hole 11. The term "a state where through hole 11 is filled with adhesive A" means a state where adhesive A is distributed without a gap in a region between the inner surface of through hole 11 and optical fiber 20. In the state where through hole 11 is filled with adhesive A, adhesive A does not protrude from through hole 11 in the X direction, and is accommodated in through hole 11. Adhesive A does not protrude upward (the Z direction) from injection hole 15, and is accommodated in injection hole 15.

When optical fiber coupling structure 25 is manufactured, first, optical fiber 20 is rotationally aligned in a state where optical fiber 20 is inserted into through hole 11 of optical fiber holding component 10. Thus, a position of optical fiber 20 with respect to optical fiber holding component 10 in the XY plane is defined, and the position (angle) of optical fiber 20 around central axis L is defined. Thereafter, liquid adhesive A is injected from injection hole 15 of optical fiber holding component 10. Adhesive A injected into injection hole 15 flows in injection hole 15 in the negative Z direction and reaches through hole 11 into which optical fiber 20 is inserted. Adhesive A spreads from constant diameter portion 12*a* of through hole 11 to fixing part 13, and is filled in a region of the gap between the inner surface of through hole 11 and optical fiber 20 and in injection hole 15. In this state, ultraviolet light is transmitted through optical fiber holding component 10 and adhesive A is irradiated with ultraviolet light, so that adhesive A is cured and optical fiber 20 is bonded and fixed to the inner surface of through hole 11. In this way, optical fiber coupling structure 25 in which optical fibers 20 are fixed to optical fiber holding component 10 is obtained.

Figure 6:
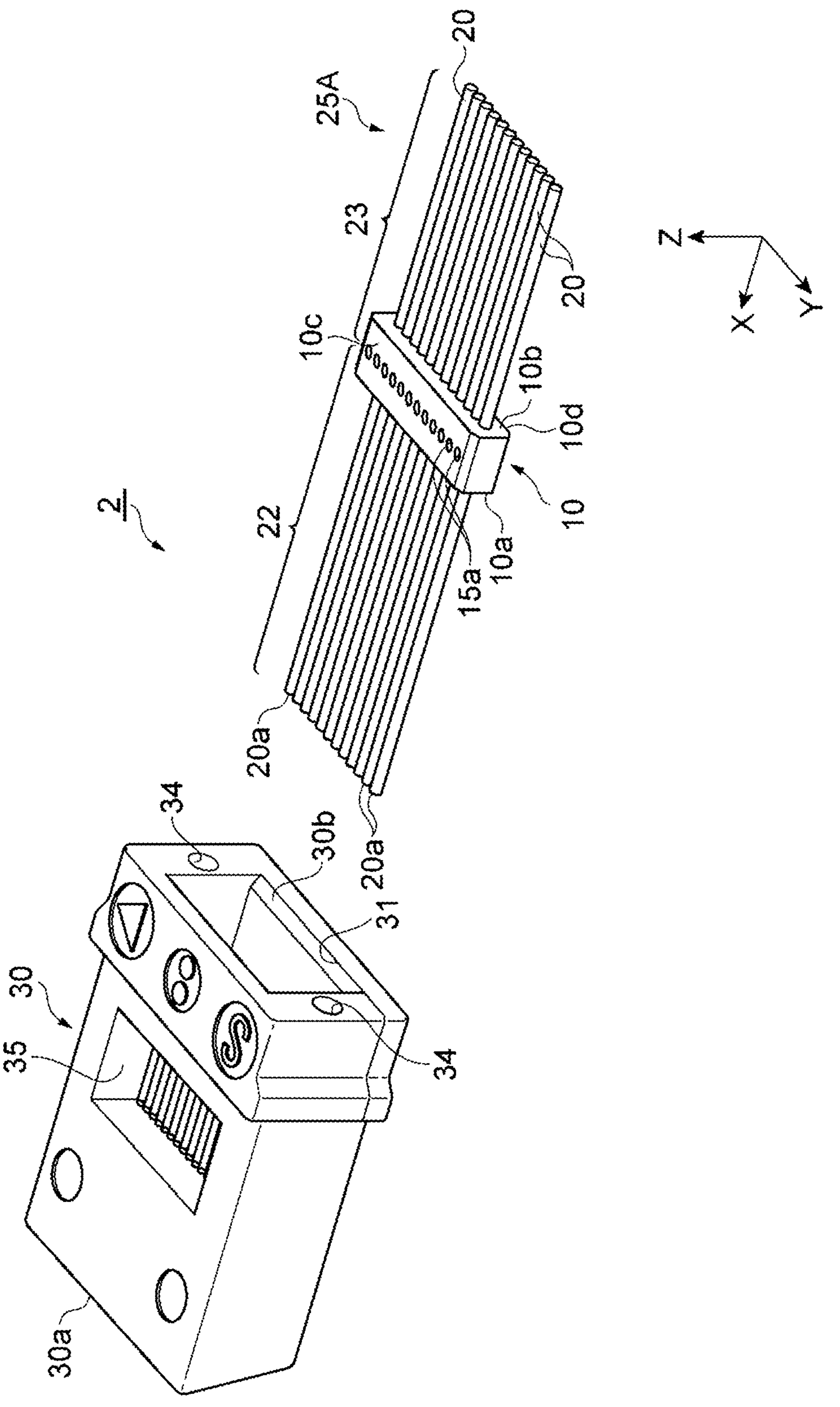
FIG. 6 is an exploded perspective view of an optical connector according to a first embodiment.
Figure 7:
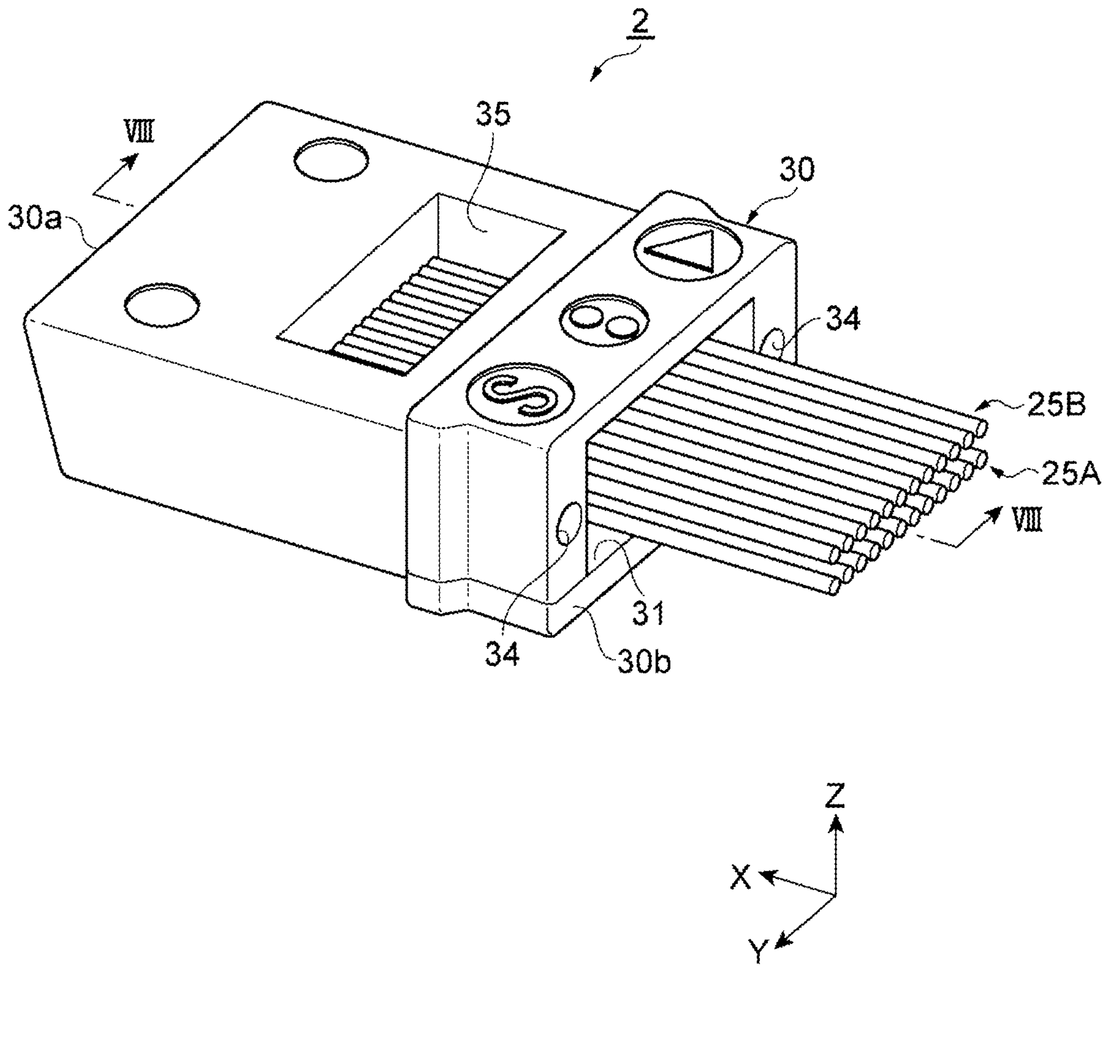
FIG. 7 is a perspective view of the optical connector of FIG. 6.

FIG. 6 is an exploded perspective view of an optical connector 2 according to the embodiment. FIG. 7 is a perspective view of optical connector 2. Optical connector 2 includes, for example, ferrule 30, a first optical fiber coupling structure 25A, and a second optical fiber coupling structure 25B. First optical fiber coupling structure 25A and second optical fiber coupling structure 25B have the same configuration as optical fiber coupling structure 25 described above. In FIG. 6, second optical fiber coupling structure 25B is omitted. First optical fiber coupling structure 25A and second optical fiber coupling structure 25B are inserted into ferrule 30 in a state where they are stacked on each other in the Z direction, for example. First optical fiber coupling structure 25A and second optical fiber coupling structure 25B are stacked in the Z direction, for example, such that their upper surfaces 10*c* face each other.

Figure 8:
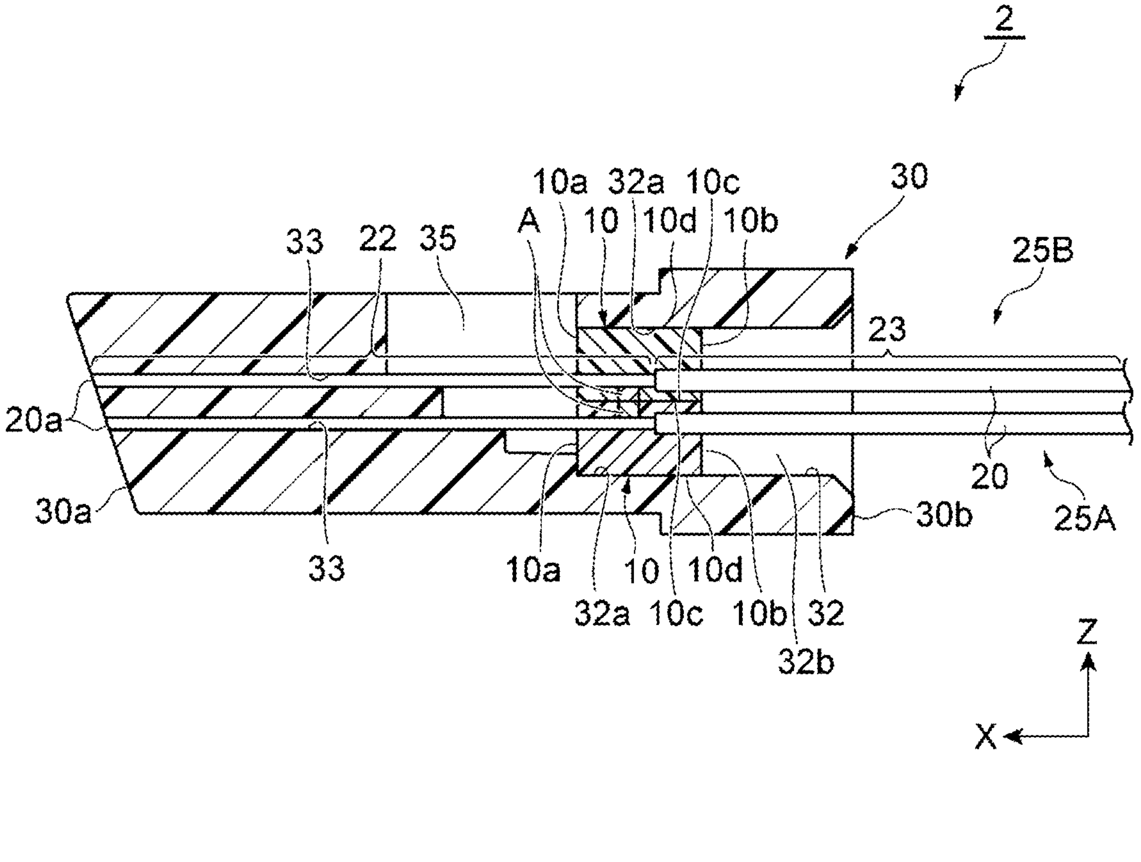
FIG. 8 is a cross-sectional view of the optical connector taken along line VIII-VIII of FIG. 7.

FIG. 8 is a cross-sectional view of optical connector 2 taken along line VIII-VIII of FIG. 7. As shown in FIG. 8, ferrule 30 has, for example, a substantially rectangular parallelepiped appearance. Ferrule 30 includes a front surface 30*a* positioned at a front end in the X direction and a back surface 30*b* positioned at a back end in the X direction. Front surface 30*a* is slightly inclined with respect to the YZ plane, for example. Front surface 30*a* is formed of, for example, substantially the same surface as tip end surface 20*a* of each optical fiber 20. That is, there is substantially no step between front surface 30*a* and tip end surface 20*a*. Back surface 30*b* is provided with an opening 31 that can collectively receive a stacked body of first optical fiber coupling structure 25A and second optical fiber coupling structure 25B stacked in the Z direction. Ferrule 30 has an accommodating hole 32 and a plurality of fiber holding holes 33 therein. Accommodating hole 32 is a hole extending from opening 31 in the X direction, and holds the stacked body of first optical fiber coupling structure 25A and second optical fiber coupling structure 25B introduced from opening 31. Accommodating hole 32 includes a pair of inner surfaces 32*a*, 32*a* (first inner surfaces) facing each other in the Z direction and a pair of inner surfaces 32*b*, 32*b* (second inner surfaces) facing each other in the Y direction. For example, inner surfaces 32*a*, 32*a* are planes parallel to the XY plane, and inner surfaces 32*b*, 32*b* are planes parallel to the XZ plane. Inner surfaces 32*a*, 32*a* are, for example, perpendicular to inner surfaces 32*b*, 32*b*.

In a state where the stacked body of first optical fiber coupling structure 25A and second optical fiber coupling structure 25B is disposed in accommodating hole 32, lower surface 10*d* of first optical fiber coupling structure 25A and lower surface 10*d* of second optical fiber coupling structure 25B are in contact with inner surfaces 32*a*, 32*a* of accommodating hole 32, respectively. Thus, positions of first optical fiber coupling structure 25A and second optical fiber coupling structure 25B in the Z direction with respect to accommodating hole 32 are maintained. Further, side surface 10*e* of first optical fiber coupling structure 25A and side surface 10*f* of second optical fiber coupling structure 25B are in contact with one inner surface 32*b* of accommodating hole 32, and side surface 10*f* of first optical fiber coupling structure 25A and side surface 10*e* of second optical fiber coupling structure 25B are in contact with the other inner surface 32*b* of accommodating hole 32. Thus, the positions of first optical fiber coupling structure 25A and second optical fiber coupling structure 25B in the Y direction with respect to accommodating hole 32 are maintained.

As shown in FIG. 8, the plurality of fiber holding holes 33 extend through ferrule 30 between accommodating hole 32 and front surface 30*a* in the X direction. The plurality of fiber holding holes 33 are arranged two dimensionally in front surface 30*a*, for example. The plurality of fiber holding holes 33 are arranged in two rows so as to correspond to the plurality of optical fibers 20 arranged in a row in first optical fiber coupling structure 25A and the plurality of optical fibers 20 arranged in a row in second optical fiber coupling structure 25B. Into the plurality of fiber holding holes 33, the plurality of coating-removed portions 22 of optical fibers 20 extending forward from second optical fiber coupling structure 25B and the plurality of coating-removed portions 22 of optical fibers 20 extending forward from first optical fiber coupling structure 25A are inserted. Ferrule 30 is formed with a pair of guide holes 34, 34 (see FIG. 6). The pair of guide holes 34, 34 extend through ferrule 30 in the negative X direction from front surface 30*a* to back surface 30*b*, and is formed in both sides with the plurality of fiber holding holes 33 interposed therebetween in the Y direction.

A window 35 for injecting an adhesive is formed in an upper surface of ferrule 30. Although the adhesive is omitted in FIG. 8, the adhesive here may be the same as adhesive A described above. The adhesive injected from window 35 is cured in each fiber holding hole 33 into which coating-removed portion 22 of each optical fiber 20 is inserted, and thus coating-removed portion 22 of each optical fiber 20 is fixed to each fiber holding hole 33. As a result, optical connector 2 in which first optical fiber coupling structure 25 and second optical fiber coupling structure 25B are fixed in ferrule 30 is obtained.

Figure 9:
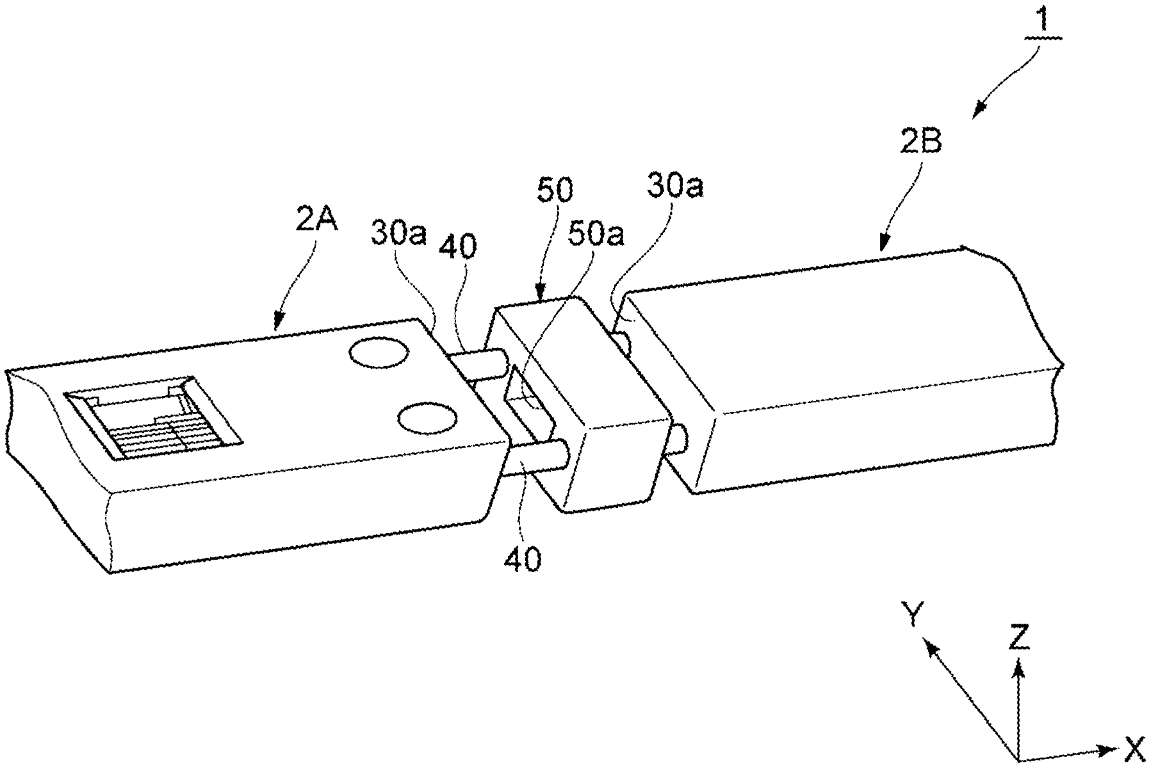
FIG. 9 is a perspective view of an optical coupling structure according to a first embodiment.

FIG. 9 is a perspective view of an optical coupling structure 1 according to the embodiment. Optical coupling structure 1 includes a first optical connector 2A, a second optical connector 2B, a pair of guide pins 40, 40, and a spacer 50. First optical connector 2A and second optical connector 2B have the same configuration as optical connector 2 described above. In optical coupling structure 1, front surface 30*a* of first optical connector 2A and front surface 30*a* of second optical connector 2B face each other in the X direction with a space interposed therebetween. The pair of guide pins 40, 40 are fitted into the pair of guide holes 34, 34 of first optical connector 2A and the pair of guide holes 34, 34 of second optical connector 2B. Thus, the positions of first optical connector 2A and second optical connector 2B in the YZ plane are maintained.

Spacer 50 is a plate-shaped member having an opening 50*a*, and is disposed between front surface 30*a* of first optical connector 2A and front surface 30*a* of second optical connector 2B in the X direction. Opening 50*a* allows a plurality of optical paths extending between first optical connector 2A and second optical connector 2B to pass through. Spacer 50 abuts on front surface 30*a* of first optical connector 2A and front surface 30*a* of second optical connector 2B in the X direction, so that the space between first optical connector 2A and second optical connector 2B in the X direction is maintained.

The effects obtained by optical fiber holding component 10, optical fiber coupling structure 25, optical connector 2, and optical coupling structure 1 according to the embodiment described above will be described. In optical fiber holding component 10, each optical fiber 20 that is rotationally aligned is inserted into each through hole 11, and adhesive A is injected into each through hole 11 from each injection hole 15, whereby each optical fiber 20 is fixed to each through hole 11. In this configuration where optical fiber 20 is inserted into through hole 11 and fixed, unlike the configuration where the optical fiber is placed on the V-groove and fixed, a situation in which optical fiber 20 moves due to a pressing force from one direction received from a lid or the like does not occur.

Further, since injection hole 15 extends in the Z direction and is individually connected to through hole 11, adhesive A can be individually injected into through hole 11 from a path different from through hole 11. In this case, by adjusting a position of injection hole 15 with respect to through hole 11, the injection amount of adhesive A, and the like in consideration of the fluidity of adhesive A, adhesive A can be reliably filled between optical fiber 20 and through hole 11 without a gap, and adhesive A can be evenly distributed around optical fiber 20. Thus, the stress generated when adhesive A is cured can be uniformly applied to optical fiber 20, and thus, a situation in which the position of optical fiber 20 changes due to the stress applied in one direction can be suppressed. Further, since adhesive A is evenly distributed around optical fiber 20, the adhesive strength between optical fiber 20 and through hole 11 can be sufficiently maintained, and thus, a situation in which the position of optical fiber 20 changes due to an impact or the like that may occur during the assembling process can also be suppressed. Thus, according to optical fiber holding component 10 described above, the position of each optical fiber 20 that has been subjected to rotational alignment in each through hole 11 can be maintained, and thus each optical fiber 20 can be held with high accuracy.

In the case where injection hole 15 is not provided, it is conceivable to inject adhesive A from one side of through hole 11 into which optical fiber 20 is inserted. However, in this method, it is difficult to spread adhesive A to the other side of through hole 11. Further, it is also conceivable to insert optical fiber 20 after injecting adhesive A into through hole 11. However, in this method, it is conceivable that injected adhesive A is pushed out and protrudes from optical fiber holding component 10 when optical fiber 20 is inserted into through hole 11. In contrast, by providing injection hole 15 as in the embodiment, as described above, adhesive A can be reliably spread in through hole 11 into which optical fiber 20 is inserted. Further, since the situation in which adhesive A is pushed out when optical fiber 20 is inserted into through hole 11 does not occur, the situation in which adhesive A protrudes from optical fiber holding component 10 can be avoided. As a result, it is possible to avoid a situation in which adhesive A becomes an obstacle and the positional accuracy of optical fiber holding component 10 with respect to ferrule 30 is reduced.

In the embodiment, optical fiber holding component 10 is made of a resin capable of transmitting ultraviolet light. In this configuration, an ultraviolet curable adhesive A can be used to fix each optical fiber 20 to each through hole 11. In this case, by irradiating adhesive A in each through hole 11 with ultraviolet light from the outside of optical fiber holding component 10, each optical fiber 20 can be fixed to each through hole 11 in a state where the position of each optical fiber 20 subjected to rotational alignment is maintained. Further, by performing injection molding using resin, optical fiber holding component 10 can be manufactured inexpensively and with high accuracy.

In the embodiment, optical fiber holding component 10 may be made of quartz glass capable of transmitting ultraviolet light. In this case, by irradiating adhesive A in each through hole 11 with ultraviolet light from the outside of optical fiber holding component 10, each optical fiber 20 can be fixed to each through hole 11 in a state where the position of each optical fiber 20 subjected to rotational alignment is maintained. Further, optical fiber holding component 10 can be manufactured at low cost and with high accuracy by using the quartz glass having high rigidity and excellent machining quality. Furthermore, since the use of the quartz glass can reduce frictional resistance between the inner surface of each through hole 11 and each optical fiber 20, operation of rotationally aligning each optical fiber 20 in each through hole 11 can be easily performed.

In the embodiment, each of the plurality of through holes 11 has holding part 12 for holding coating-removed portion 22 and fixing part 13 for fixing coated portion 23. When each optical fiber 20 is assembled to optical fiber holding component 10, coating-removed portion 22 of each optical fiber 20 is held by holding part 12, and coated portion 23 of each optical fiber 20 is fixed to fixing part 13. In this way, with the configuration in which coated portion 23 of each optical fiber 20 is fixed to fixing part 13, even when bending occurs in a back portion of coated portion 23 that is not fixed to fixing part 13, the stress due to the bending can be made difficult to be transmitted to coating-removed portion 22 having a relatively low strength. This can suppress a situation in which each optical fiber 20 is damaged by bending.

In the embodiment, holding part 12 may be configured to hold coating-removed portion 22 to be rotatable around central axis L of coating-removed portion 22. In this case, the rotational alignment of coating-removed portion 22 of each optical fiber 20 in holding part 12 of each through hole 11 is performed, so that the position of each optical fiber 20 in the rotational direction with respect to optical fiber holding component 10 can be determined.

In the embodiment, holding part 12 has constant diameter portion **12*a* having a constant inner diameter and increased-diameter portion 12*b* having an inner diameter increasing from constant diameter portion 12*a* toward fixing part 13. This allows coating-removed portion 22 of each optical fiber 20 to be easily inserted from increased-diameter portion 12*b* to constant diameter portion 12*a* of each through hole 11**.

In the embodiment, fixing part 13 of each through hole 11 is individually connected to holding part 12 of each through hole 11 in the X direction. Thus, coated portion 23 of each optical fiber 20 can be inserted into each fixing part 13 and fixed more reliably, and thus, bending stress can be made less likely to be transmitted to coating-removed portion 22 of each optical fiber 20.

In the embodiment, each of the plurality of injection holes 15 extends through optical fiber holding component 10 from upper surface **10*c* to holding part 12 in the negative Z direction. Thus, adhesive A injected into each injection hole 15 from upper surface 10*c* can be more reliably spread to holding part 12 of each through hole 11, and coating-removed portion 22 can be more reliably fixed to holding part 12 by adhesive A. As a result, the position of each optical fiber 20 that has been subjected to rotational alignment in each through hole 11** can be maintained more reliably.

In the embodiment, the plurality of openings **15*a* formed in upper surface 10*c* may include first opening 15A and second opening 15B adjacent to each other, second opening 15B is the closest opening to first opening 15A, and second opening 15B may be formed at a position separated from first opening 15A in upper surface 10*c*. In the case where adhesive A is injected into second opening 15B after adhesive A is injected into first opening 15A, if adhesive A leaks from second opening 15B and is cured in a state of flowing to first opening 15A into which adhesive A has already been injected, a bulge may be generated in the vicinity of first opening 15A. Such a bulge may be a factor that reduces the positional accuracy of optical fiber holding component 10 with respect to ferrule 30. In contrast, in the above-described configuration, second opening 15B is separated from first opening 15A, and thus it is possible to suppress a situation in which adhesive A leaking from second opening 15B flows to first opening 15A and forms a bulge. This can suppress a situation in which the positional accuracy of optical fiber holding component 10 with respect to ferrule 30** is reduced.

In the embodiment, each of the plurality of optical fibers 20 has at least one core 14*a* in a region shifted from central axis L. In this configuration, the position of each optical fiber 20 in the rotational direction with respect to optical fiber holding component 10 can be determined by performing rotational alignment of each optical fiber 20 in each through hole 11.

In the embodiment, optical connector 2 includes optical fiber holding component 10, and thus, as described above, each optical fiber 20 can be held with high accuracy. Further, lower surface 10*d* and side surface 10*e* of optical fiber holding component 10 are in contact with inner surface 32*a* and inner surface 32*b* of ferrule 30, respectively, and thus the position of optical fiber holding component 10 with respect to ferrule 30 can be maintained with high accuracy.

In the embodiment, optical connector 2 includes first optical fiber coupling structure 25A and second optical fiber coupling structure 25B, and first optical fiber coupling structure 25A and second optical fiber coupling structure 25B are stacked on each other at accommodating hole 32 in the Z direction. In this configuration, even when the plurality of fiber holding holes 33 of ferrule 30 are arranged in a multi-tiered manner in the Z direction, first optical fiber coupling structure 25A and second optical fiber coupling structure 25B are stacked on each other in the Z direction, and thus the plurality of optical fibers 20 can be arranged so as to correspond to the arrangement of the plurality of fiber holding holes 33.

In the embodiment, in optical coupling structure 1, first optical connector 2A and second optical connector 2B face each other with a gap interposed between first optical connector 2A and second optical connector 2B in the X direction. In this way, when first optical connector 2A and second optical connector 2B are not connected by PC (Physical Contact), a pressing force for PC connection of first optical connector 2A and second optical connector 2B is not necessary, and thus, it is possible to collectively and easily connect more optical fibers 20.

Modification 1

Figure 10:
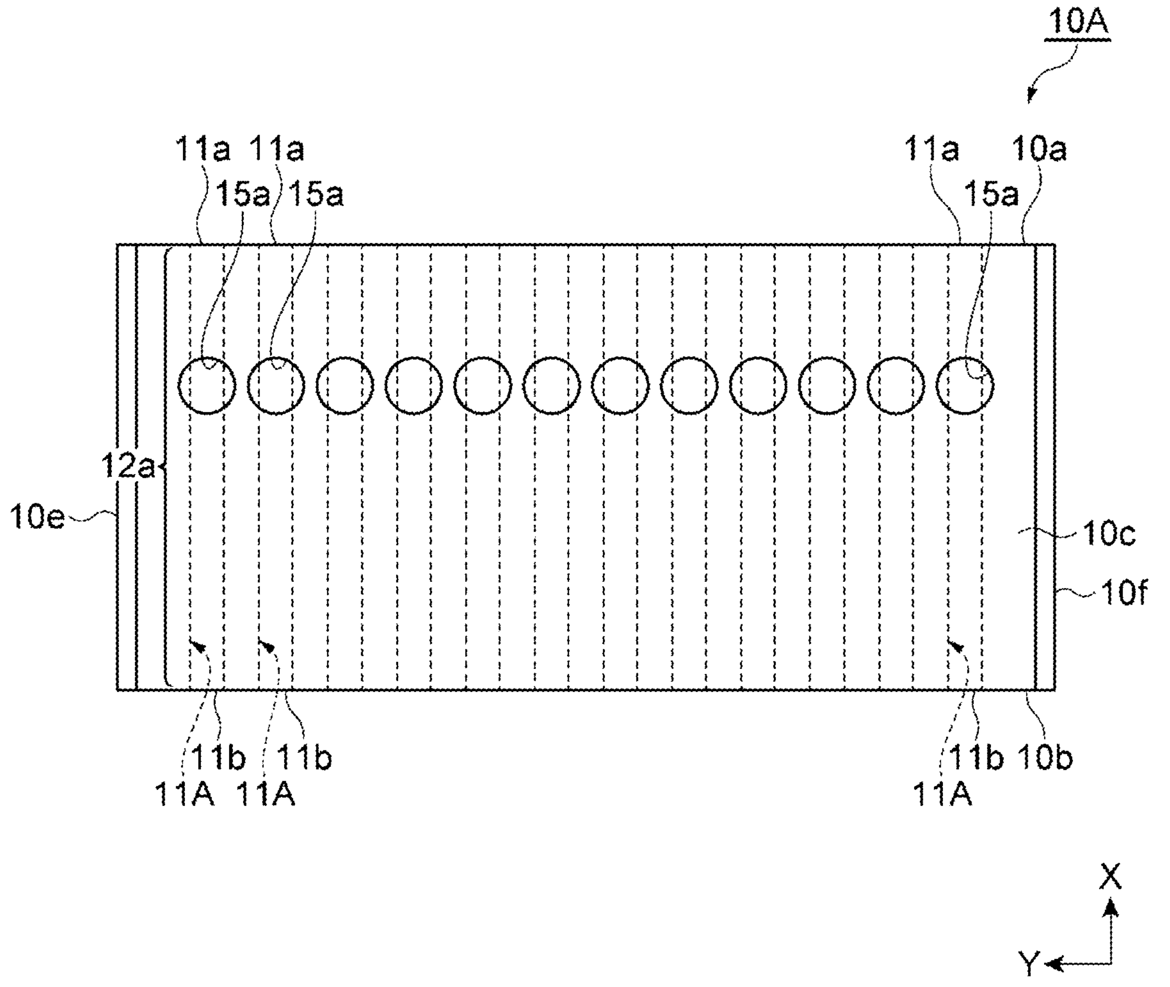
FIG. 10 is a plan view of an optical fiber holding component according to a modification 1.

FIG. 10 is a plan view of an optical fiber holding component 10A according to a modification 1. Optical fiber holding component 10A includes a through hole 11A having only constant diameter portion 12*a* of holding part 12, unlike optical fiber holding component 10 according to the above-described embodiment. In this case, constant diameter portion 12*a* extends through optical fiber holding component 10A from front surface 10*a* to back surface 10*b* in the X direction. Coating-removed portion 22 of optical fiber 20 is inserted into and fixed to constant diameter portion 12*a*. Thus, in the example shown in FIG. 10, coated portion 23 of optical fiber 20 is not held by optical fiber holding component 10A, and only coating-removed portion 22 of optical fiber 20 is held by optical fiber holding component 10A. Even in such a form, adhesive A can be reliably filled between constant diameter portion 12*a* and optical fiber 20 without a gap, and thus optical fiber 20 can be held with high accuracy, as in the above-described embodiment.

Modification 2

Figure 11:
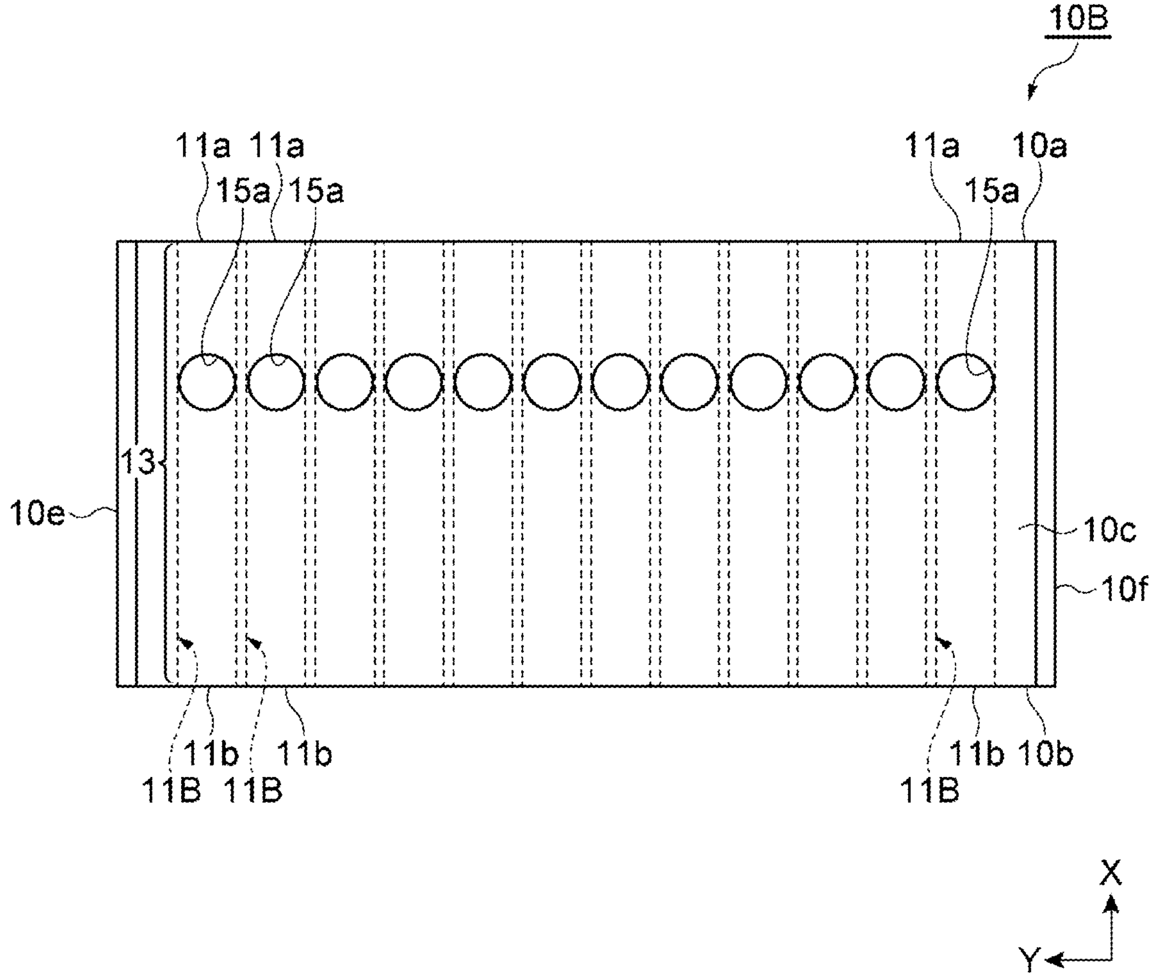
FIG. 11 is a plan view of an optical fiber holding component according to a modification 2.

FIG. 11 is a plan view of an optical fiber holding component 10B according to a modification 2. Optical fiber holding component 10B includes a through hole 11B having only fixing part 13, unlike optical fiber holding component 10 according to the above-described embodiment. In this case, fixing part 13 extends through optical fiber holding component 10B from front surface 10*a* to back surface 10*b* in the X direction. Coated portion 23 of optical fiber 20 is inserted into and fixed to fixing part 13. Thus, in the example shown in FIG. 11, coating-removed portion 22 of optical fiber 20 is not held by optical fiber holding component 10B, and only coated portion 23 of optical fiber 20 is held by optical fiber holding component 10B. Even in such a form, adhesive A can be reliably filled between fixing part 13 and optical fiber 20 without a gap, and thus optical fiber 20 can be held with high accuracy as in the above-described embodiment.

Modification 3

Figure 12:
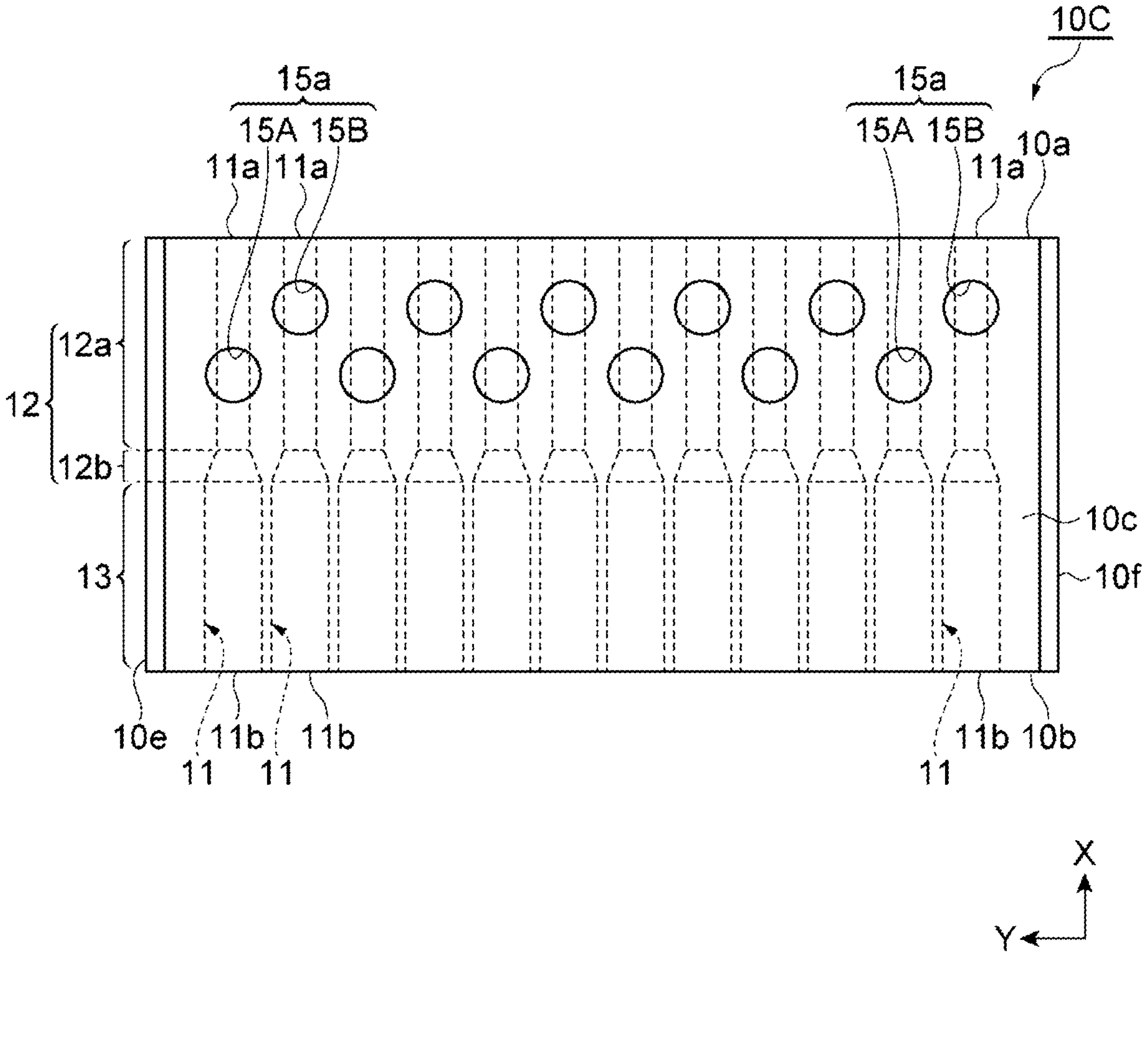
FIG. 12 is a plan view of an optical fiber holding component according to a modification 3.

FIG. 12 is a plan view of an optical fiber holding component 10C according to a modification 3. In optical fiber holding component 10C, the arrangement of opening 15*a* of each injection hole 15 is different from that of the above-described embodiment. In optical fiber holding component 10C, each opening 15*a* is not arranged in a row in the Y direction, but is arranged in two lines so as to be alternate in the Y direction. First opening 15A and second opening 15B adjacent to each other, second opening 15B being closest to first opening 15A, among the plurality of openings 15*a*, are arranged so as to be shifted from each other in the X direction on upper surface 10*c*. The state where second opening 15B is “shifted in the X direction” with respect to first opening 15A may be, for example, a state where a center of second opening 15B is shifted in the X direction from a center of first opening 15A when second opening 15B is viewed in the Y direction. When second opening 15B is viewed in the Y direction, second opening 15B may have a portion overlapping first opening 15A as long as the center of second opening 15B is shifted in the X direction from the center of first opening 15A.

Second opening 15B is shifted, for example, toward front surface 10*a* in the X direction with respect to first opening 15A. Both first opening 15A and second opening 15B are formed at positions each overlapping constant diameter portion 12*a* of through hole 11 in the Z direction. Thus, injection hole 15 extending from first opening 15A in the negative Z direction and injection hole 15 extending from second opening 15B in the negative Z direction are both connected to constant diameter portion 12*a* of each through hole 11. An amount of deviation in the X direction between second opening 15B and first opening 15A, that is, the length between the center of second opening 15B and the center of first opening 15A in the X direction may be, for example, equal to or more than the inner diameter of opening 15*a*. In this case, second opening 15B is arranged so as not to overlap first opening 15A in the X direction. For example, second opening 15B may be arranged to be separated from first opening 15A in the X direction when second opening 15B is viewed in the Y direction.

Even in such a form, adhesive A can be reliably filled between through hole 11 and optical fiber 20 without a gap, and thus optical fiber 20 can be held with high accuracy as in the above-described embodiment. Further, in optical fiber holding component 10C, second opening 15B is arranged so as to be shifted from first opening 15A in the X direction. Thus, for example, when adhesive A is injected into second opening 15B after adhesive A is injected into first opening 15A, adhesive A that has leaked from second opening 15B can be made less likely to flow into first opening 15A into which adhesive A has already been injected. As a result, it is possible to more reliably suppress a situation in which adhesive A forms a bulge in the vicinity of first opening 15A. This can suppress a situation in which the positional accuracy of optical fiber holding component 10C with respect to ferrule 30 is reduced.

Modification 4

Figure 13:
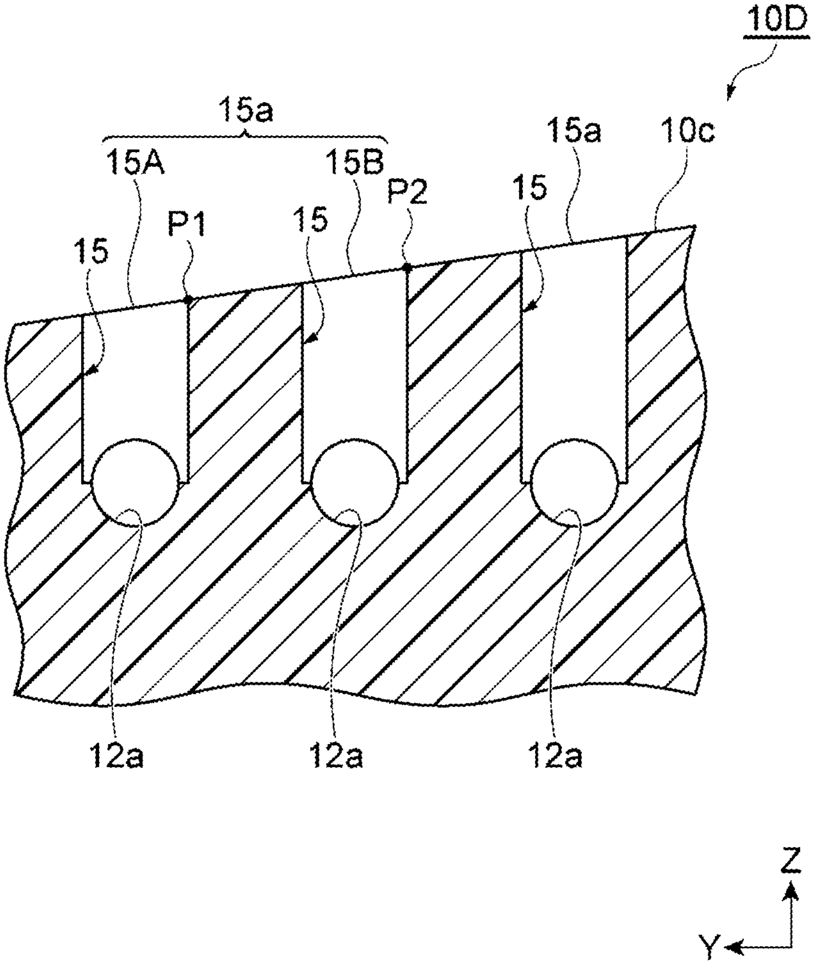
FIG. 13 is a cross-sectional view of an optical fiber holding component according to a modification 4.

FIG. 13 is a cross-sectional view of an optical fiber holding component 10D according to a modification 4. In optical fiber holding component 10D, upper surface 10*c* is inclined from the XY plane. To be specific, upper surface 10*c* is inclined so as to be gradually positioned upward toward one side (for example, toward side surface 10*f*) in the Y direction in a YZ cross section. On the other hand, since lower surface 10*d* is along the XY plane, it can be said that upper surface 10*c* is inclined with respect to lower surface 10*d*. A height of each opening 15*a* is different from each other when the position of lower surface 10*d* in the Z direction is set as a reference. That is, first opening 15A and second opening 15B adjacent to each other among the plurality of openings 15*a*, second opening 15B being closest to first opening 15A, are arranged so as to be shifted from each other in the Z direction" in upper surface 10*c*. The state where second opening 15B is "shifted in the Z direction with respect to first opening 15A may be, for example, a state where a position P2 of an upper end of second opening 15B is shifted in the Z direction with respect to a position P1 of an upper end of first opening 15A.

Even in such a form, adhesive A can be reliably filled between through hole 11 and optical fiber 20 without a gap, and thus optical fiber 20 can be held with high accuracy as in the above-described embodiment. Further, in optical fiber holding component 10D, second opening 15B is arranged so as to be shifted from first opening 15A in the Z direction. This can more reliably suppress a situation in which, for example, adhesive A that has leaked out from second opening 15B flows into first opening 15A into which adhesive A has already been injected and forms a bulge in the vicinity of first opening 15A. This can suppress a situation in which the positional accuracy of optical fiber holding component 10D with respect to ferrule 30 is reduced.

Modification 5

Figure 14:
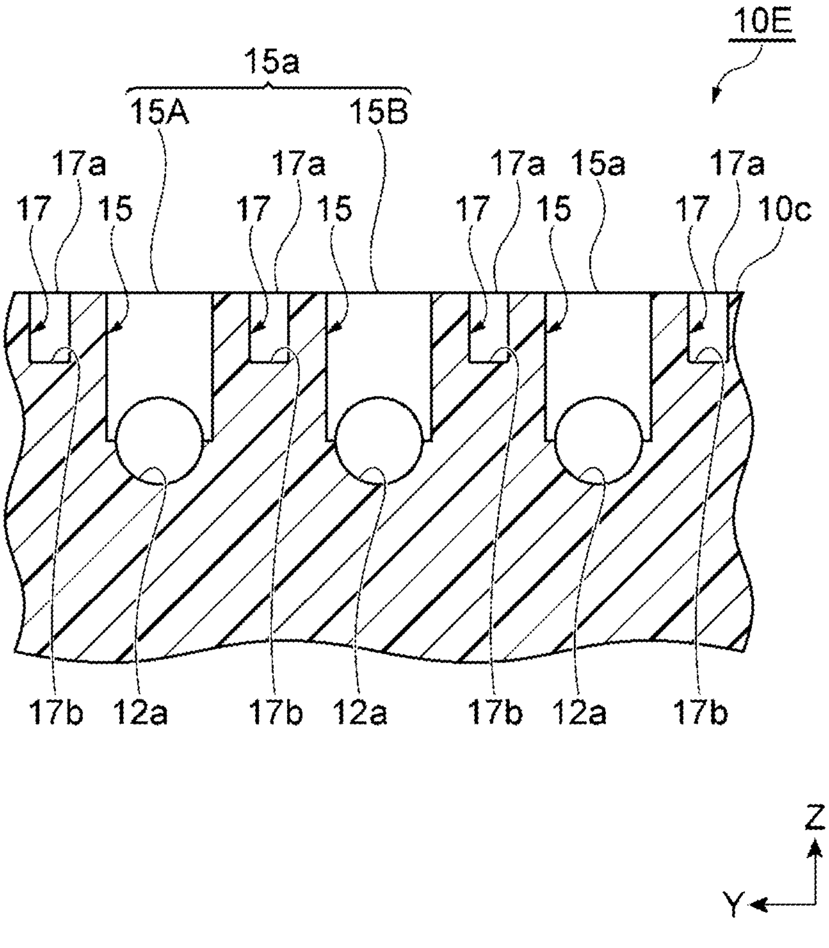
FIG. 14 is a cross-sectional view of an optical fiber holding component according to a modification 5.

FIG. 14 is a cross-sectional view of an optical fiber holding component 10E according to a modification 5. In optical fiber holding component 10E, upper surface 10*c* has a plurality of recessed portions 17. Each of the plurality of recessed portions 17 is arranged in the Y direction and is formed between two injection holes 15 that are adjacent to each other and closest to each other in the Y direction. As a result, one recessed portion 17 is formed between first opening 15A and second opening 15B adjacent to each other, second opening 15B being closest to first opening 15A in the Y direction. Each recessed portion 17 is recessed in the negative Z direction from upper surface 10*c*, and forms an opening 17*a* in upper surface 10*c*. Opening 17*a* has, for example, a circular shape when opening 17*a* is viewed in the Z direction, and has an inner diameter smaller than that of opening 15*a*. A depth of recessed portion 17 from upper surface 10*c* may be smaller than a depth of injection hole 15 from upper surface 10*c*. For example, a bottom surface 17*b* of recessed portion 17 may be positioned between upper surface 10*c* and through hole 11 in the Z direction.

Even in such a form, adhesive A can be reliably filled between through hole 11 and optical fiber 20 without a gap, and thus optical fiber 20 can be held with high accuracy as in the above-described embodiment. Further, in optical fiber holding component 10E, recessed portion 17 is formed between second opening 15B and first opening 15A. Thus, even if adhesive A leaks out from second opening 15B, leaking adhesive A can be released to recessed portion 17 between first opening 15A and second opening 15B, and thus it is possible to suppress a situation in which the leaking adhesive A flows to first opening 15A and forms a bulge. This can suppress a situation in which the positional accuracy of optical fiber holding component 10E with respect to ferrule 30 is reduced.

Modification 6

Figure 15:
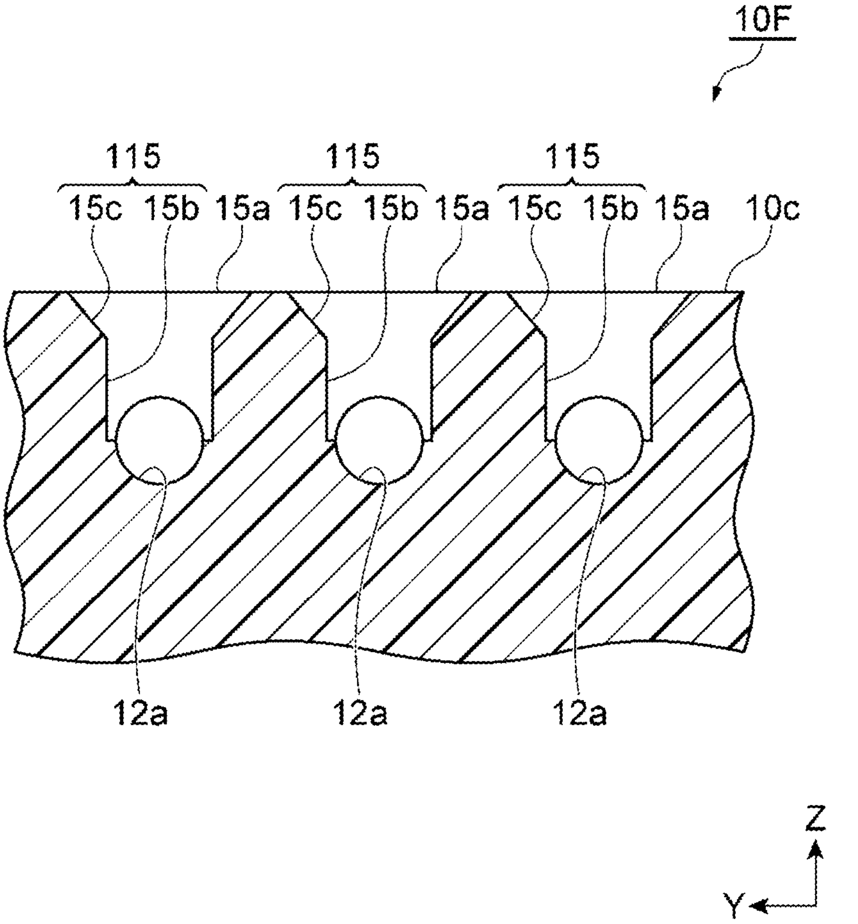
FIG. 15 is a cross-sectional view of an optical fiber holding component according to a modification 6.

FIG. 15 is a cross-sectional view of an optical fiber holding component 10F according to a modification 6. In optical fiber holding component 10F, an injection hole 115 includes a constant diameter portion 15*b* extending in the Z direction and an increased-diameter portion 15*c* formed between constant diameter portion 15*b* and upper surface 10*c* in the Z direction. Constant diameter portion 15*b* is a portion in which the inner diameter is constant at each position along the Z direction. Constant diameter portion 15*b* extends linearly between through hole 11 and increased-diameter portion 15*c* in the Z direction. Increased-diameter portion 15*c* is a portion in which the inner diameter increases from constant diameter portion 15*b* toward upper surface 10*c*. Increased-diameter portion 15*c* extends from constant diameter portion 15*b* to upper surface 10*c* in the Z direction and opens at upper surface 10*c*. An inner diameter of an opening portion of increased-diameter portion 15*c* at upper surface 10*c* is larger than an inner diameter of constant diameter portion 15*b*.

Even in such a form, adhesive A can be reliably filled between through hole 11 and optical fiber 20 without a gap, and thus optical fiber 20 can be held with high accuracy as in the above-described embodiment. Furthermore, in optical fiber holding component 10F, increased-diameter portion 15*c* is provided, and thus it is possible to make it difficult for adhesive A to leak onto upper surface 10*c* from opening 15*a* of each injection hole 115. This can more reliably suppress a situation in which adhesive A forms a bulge on upper surface 10*c*. This can suppress a situation in which the positional accuracy of optical fiber holding component 10F with respect to ferrule 30 is reduced.

Modification 7

Figure 16:
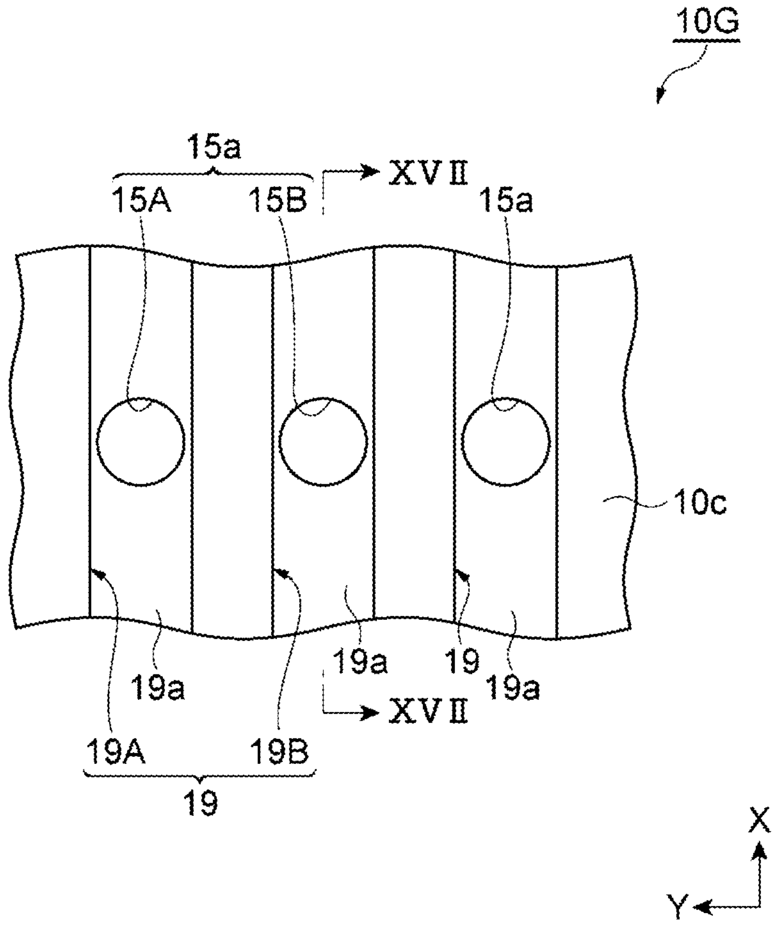
FIG. 16 is a plan view of an optical fiber holding component according to a modification 7.
Figure 17:
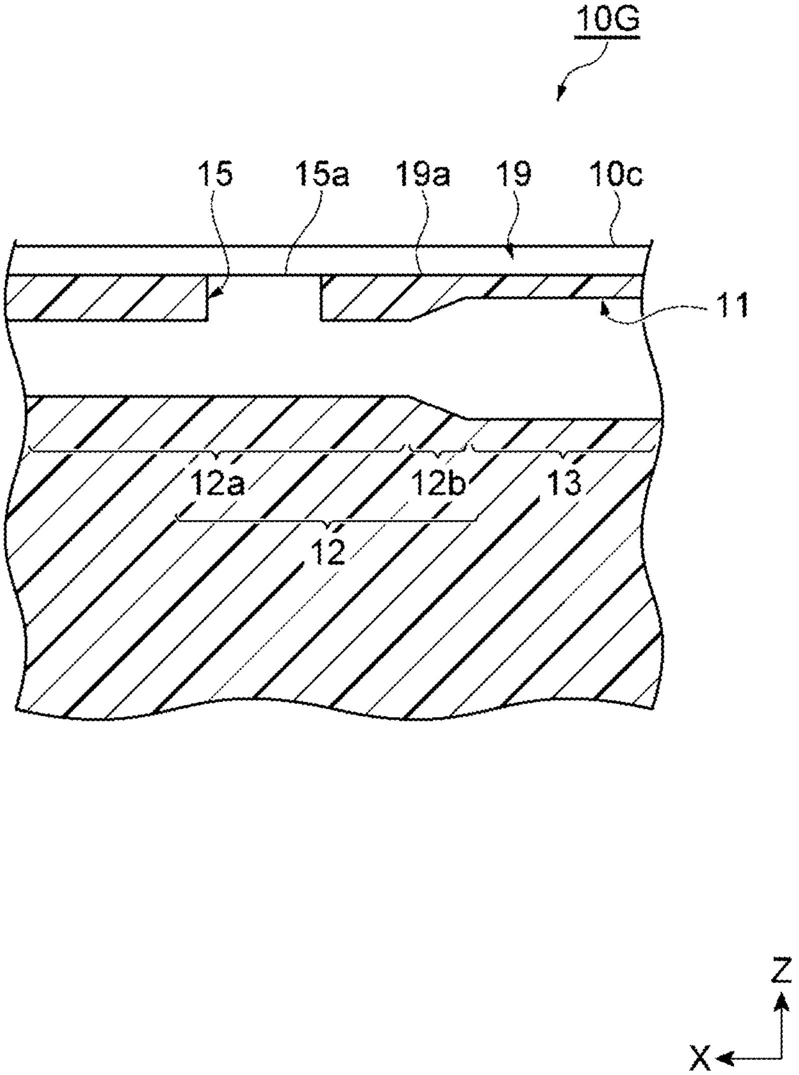
FIG. 17 is a cross-sectional view of the optical fiber holding component taken along line XVII-XVII of FIG. 16.

FIG. 16 is a plan view of an optical fiber holding component 10G according to a modification 7. FIG. 17 is a cross-sectional view of optical fiber holding component 10G taken along line XVII-XVII of FIG. 16. In optical fiber holding component 10G, upper surface 10*c* has a plurality of grooves 19. As shown in FIG. 16, the plurality of grooves 19 are arranged at intervals in the Y direction and extend in the X direction. Each groove 19 is formed so as to pass through each injection hole 15. Thus, each groove 19 intersects each injection hole 15, and an inner space of each groove 19 is connected to opening 15*a* of each injection hole 15. The plurality of grooves 19 include a first groove 19A connected to first opening 15A and a second groove 19B connected to second opening 15B closest to first opening 15A. First opening 15A is formed in a bottom surface 19*a* of first groove 19A, and second opening 15B is formed in bottom surface 19*a* of second groove 19B. For example, when an inner diameter of first opening 15A and an inner diameter of second opening 15B are 126 μm to 240 μm, the separation distance between first groove 19A and second groove 19B may be 126 μm to 240 μm.

As shown in FIG. 17, a depth of groove 19 from upper surface 10*c* (i.e., a depth between upper surface 10*c* and bottom surface 19*a* in the Z direction) is set to such an extent that groove 19 does not interfere with through hole 11. That is, bottom surface 19*a* of groove 19 is positioned between upper surface 10*c* and through hole 11 in the Z direction. Even in such a form, adhesive A can be reliably filled between through hole 11 and optical fiber 20 without a gap, and thus optical fiber 20 can be held with high accuracy as in the above-described embodiment. Further, in optical fiber holding component 10G, groove 19 is provided, and thus it is possible to make it difficult for adhesive A to leak onto upper surface 10*c* from opening 15*a* of each injection hole 15. This can more reliably suppress a situation in which adhesive A forms a bulge on upper surface 10*c*. This can suppress a situation in which the positional accuracy of optical fiber holding component 10G with respect to ferrule 30 is reduced.

Second Embodiment

Next, an optical fiber holding component 110 according to a second embodiment will be described. In the following description of the second embodiment, the description of the same parts as those of the first embodiment will be omitted as appropriate, and parts different from those of the first embodiment will be mainly described.

Figure 18:
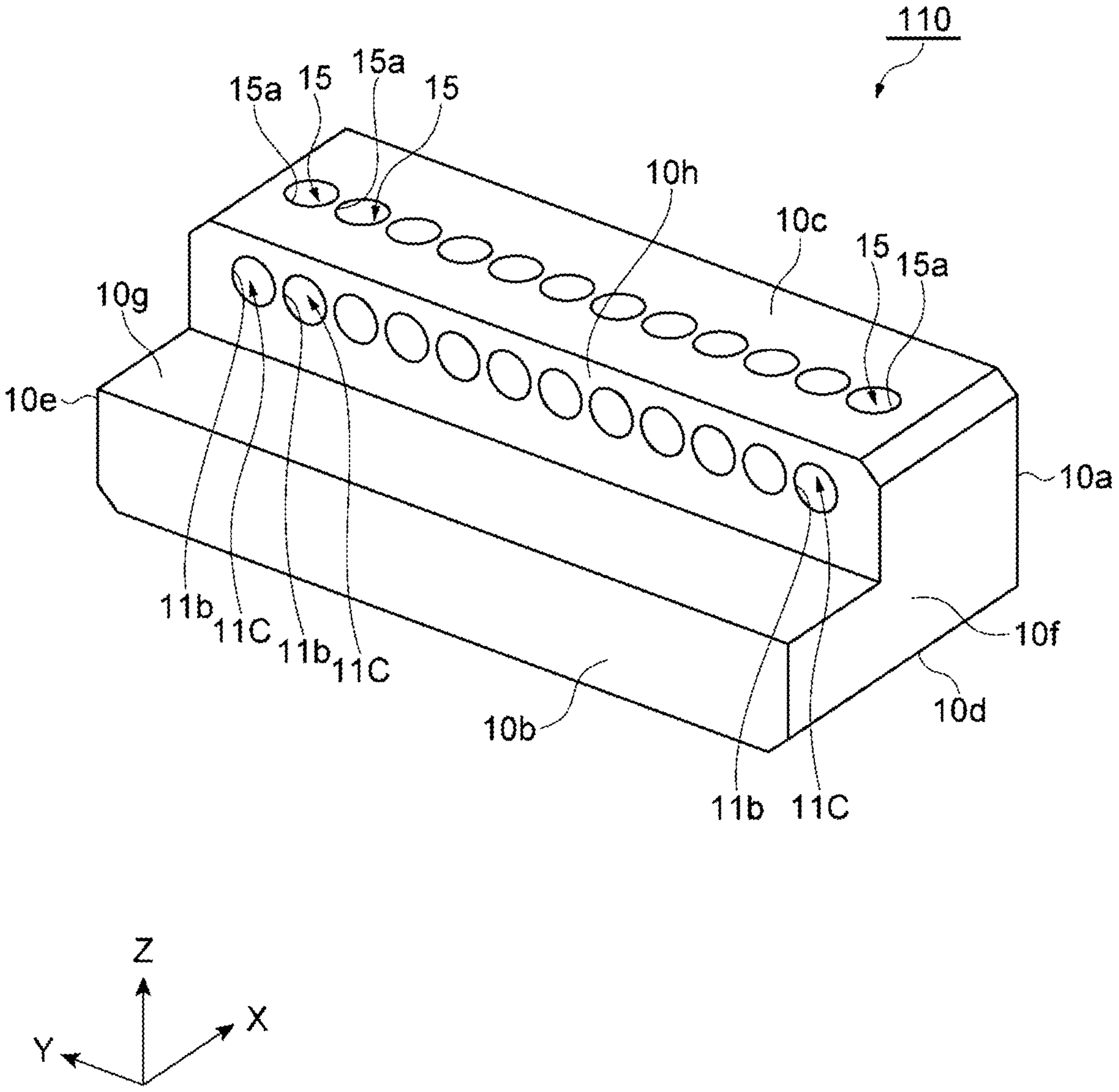
FIG. 18 is a perspective view of an optical fiber holding component according to a second embodiment.
Figure 19:
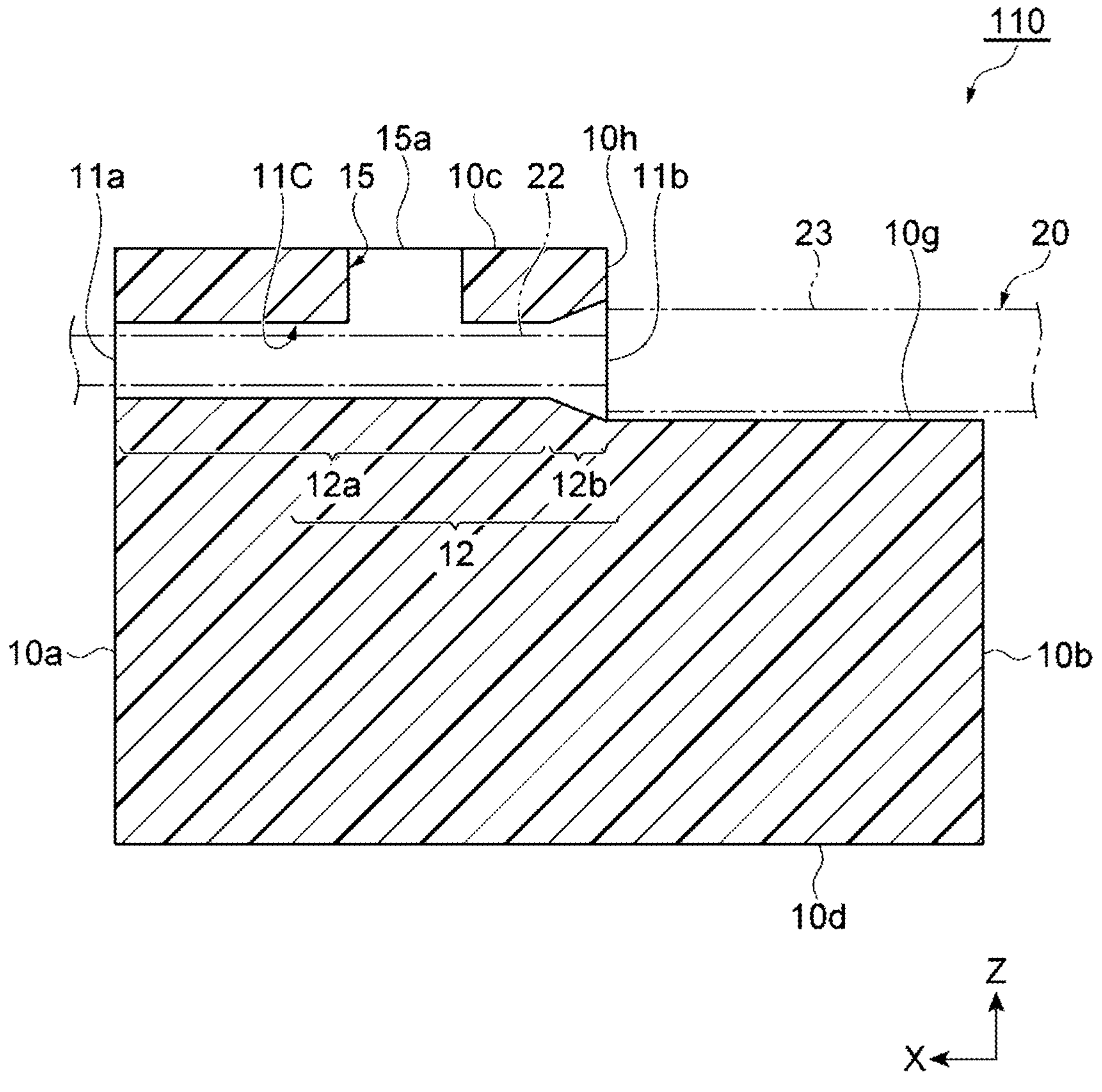
FIG. 19 is a cross-sectional view of the optical fiber holding component of FIG. 18.

FIG. 18 is a perspective view of optical fiber holding component 110 according to the second embodiment. FIG. 19 is a cross-sectional view of optical fiber holding component 110. Optical fiber holding component 110 according to the embodiment includes a fixing surface 10*g* (fixing part) for fixing coated portions 23 of the plurality of optical fibers 20 at a portion close to back surface 10*b* in the X direction. Fixing surface 10*g* is, for example, a plane along the XY plane, and forms a step with respect to upper surface 10*c*. Fixing surface 10*g* extends, for example, parallel to upper surface 10*c*. Fixing surface 10*g* is disposed at a position shifted toward lower surface 10*d* with respect to a through hole 11C in the Z direction. That is, fixing surface 10*g* is disposed at a position between through hole 11C and the side of lower surface 10*d* in the Z direction. That is, fixing surface 10*g* is provided at a position lower than through hole 11C when the position of lower surface 10*d* in the Z direction is set as a reference.

The term "the position lower than through hole 11C" may specifically be a position of one end (lower end) of an inner surface constituting through hole 11C, which is closer to lower surface 10*d* in the Z direction. As a result, fixing surface 10*g* is positioned at a height between through hole 11C (to be specific, the lower end of the inner surface constituting through hole 11C) and lower surface 10*d* in the Z direction. A connection surface 10*h* connecting fixing surface 10*g* and upper surface 10*c* in the Z direction is formed between fixing surface 10*g* and upper surface 10*c*. Connection surface 10*h* is, for example, a plane along the YZ plane and is perpendicular to upper surface 10*c* and fixing surface 10*g*. Connection surface 10*h* is positioned between front surface 10*a* and back surface 10*b* when connection surface 10*h* is viewed in the Z direction. Opening 11*b* of each through hole 11C is formed in connection surface 10*h*. Thus, in optical fiber holding component 110, each through hole 11C extends through optical fiber holding component 110 in the negative X direction from front surface 10*a* to connection surface 10*h*.

As shown in FIG. 19, through hole 11C does not have fixing part 13 (see FIG. 2), but has only constant diameter portion 12*a* and increased-diameter portion 12*b* which are holding part 12. When optical fiber 20 is fixed to optical fiber holding component 110, coating-removed portion 22 of optical fiber 20 is inserted into holding part 12 of through hole 11C while coated portion 23 of optical fiber 20 is placed along fixing surface 10*g*. Then, coating-removed portion 22 is fixed to holding part 12 by adhesive A injected from injection hole 15, and coated portion 23 is fixed to fixing surface 10*g* by an adhesive or the like.

In optical fiber holding component 110 according to the embodiment, adhesive A can be reliably filled between through hole 11C and optical fiber 20 without a gap, and thus optical fiber 20 can be held with high accuracy, as in the first embodiment described above. Furthermore, in optical fiber holding component 110, coating-removed portion 22 of each optical fiber 20 can be inserted into holding part 12 of each through hole 11C while coated portion 23 of each optical fiber 20 is placed along fixing surface 10*g*, and thus insertion work of coating-removed portion 22 into holding part 12 is facilitated. Further, since coated portion 23 of each optical fiber 20 is placed along fixing surface 10*g*, an attitude of coating-removed portion 22 with respect to holding part 12 can be stabilized, and thus, it is possible to suppress a situation in which bending stress is generated in coating-removed portion 22 when coating-removed portion 22 is inserted into holding part 12.

Third Embodiment

Next, an optical fiber holding component 210 according to a third embodiment will be described. In the following description of the third embodiment, the description of the parts overlapping with the first embodiment will be omitted as appropriate, and the parts different from the first embodiment will be mainly described.

Figure 20:
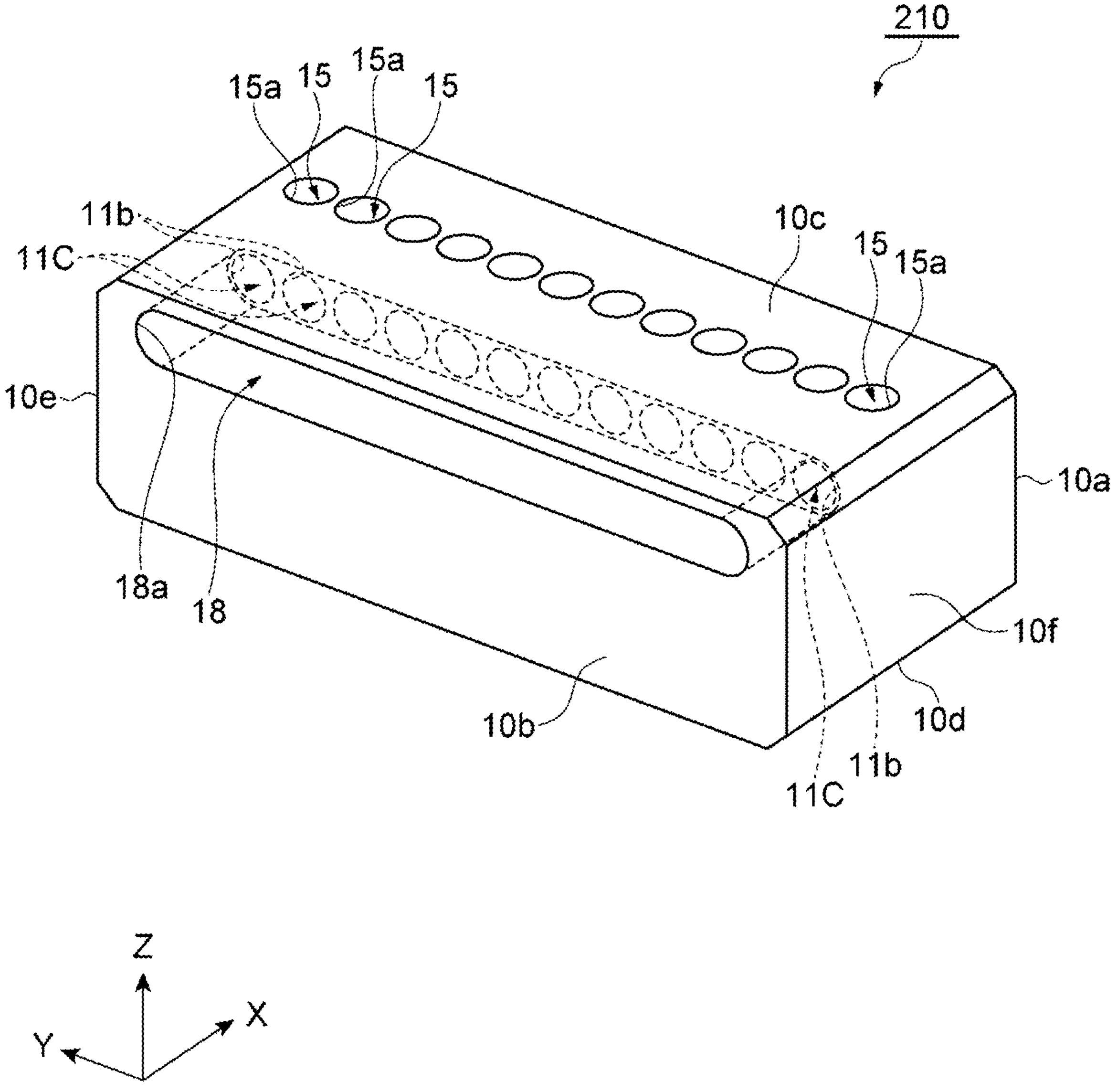
FIG. 20 is a perspective view of an optical fiber holding component according to a third embodiment.
Figure 21:
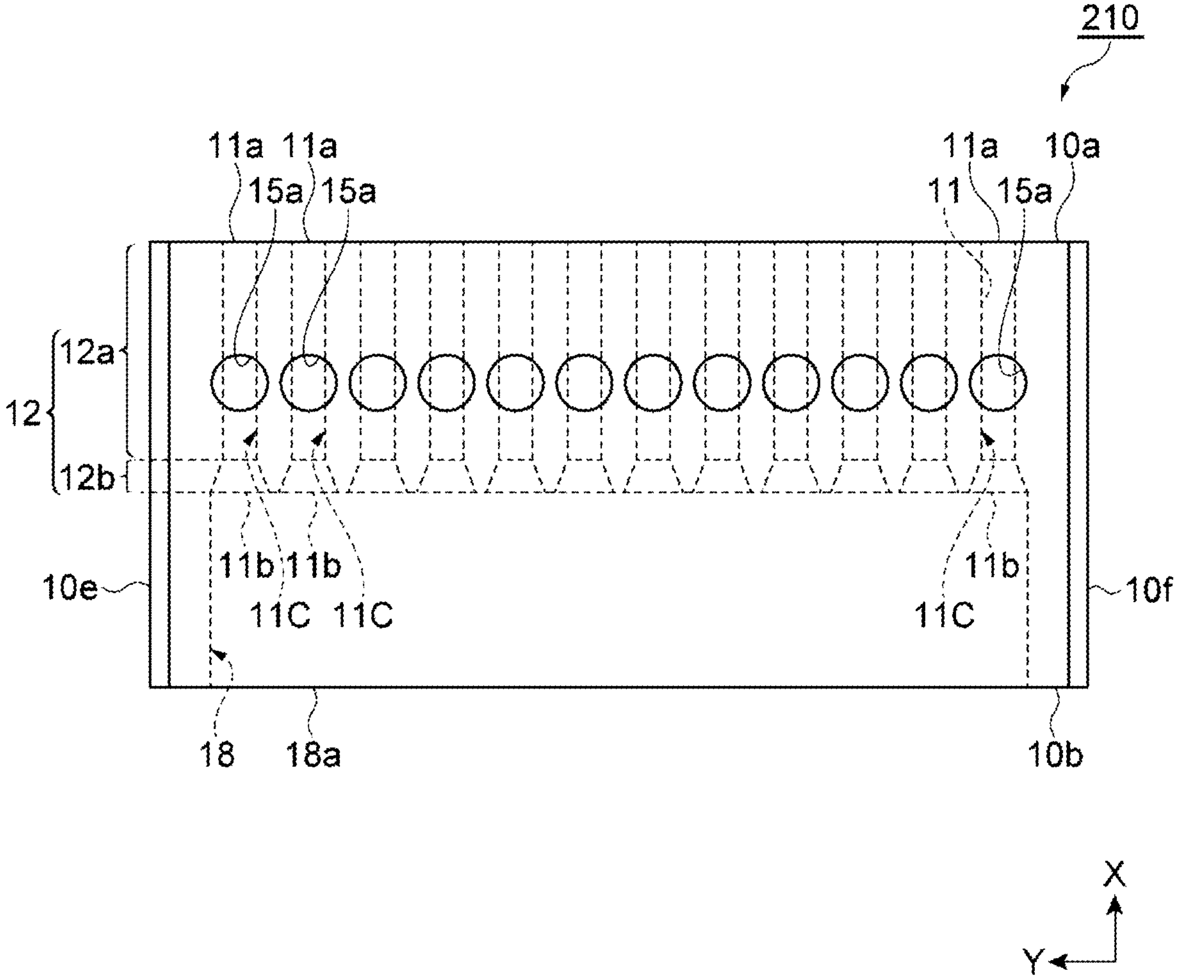
FIG. 21 is a plan view of the optical fiber holding component of FIG. 20.

FIG. 20 is a perspective view of optical fiber holding component 210 according to the third embodiment. FIG. 21 is a plan view of optical fiber holding component 210. Optical fiber holding component 210 according to the embodiment includes one fixing hole 18 connected to a plurality of through holes 11C. As in the second embodiment, through hole 11C does not have fixing part 13 (see FIG. 2), but has only constant diameter portion 12*a* and increased-diameter portion 12*b*, which are holding parts 12. Fixing hole 18 extends through optical fiber holding component 210 from back surface 10*b* to the plurality of through holes 11C in the X direction, and is connected to all through holes 11C in the X direction.

Fixing hole 18 forms an opening 18*a* in back surface 10*b*. Opening 18*a* has, for example, an oval shape whose longer side direction is the Y direction. Opening 18*a* has a size that includes all through holes 11C when opening 18*a* is viewed in the X direction. Coated portions 23 of the plurality of optical fibers 20 are inserted collectively into fixing hole 18. When optical fiber 20 is fixed to optical fiber holding component 210, coating-removed portion 22 of optical fiber 20 is inserted into holding part 12 of through hole 11C while coated portion 23 of optical fiber 20 is placed along fixing hole 18. Then, coating-removed portion 22 is fixed to holding part 12 by adhesive A injected from injection hole 15, and coated portion 23 is fixed to fixing hole 18 by an adhesive or the like.

In optical fiber holding component 210 according to the embodiment, adhesive A can be reliably filled between through hole 11C and optical fiber 20 without a gap, and thus optical fiber 20 can be held with high accuracy, as in the first embodiment described above. Furthermore, since fixing hole 18 into which coated portions 23 of the plurality of optical fibers 20 are collectively inserted is provided, coated portion 23 of each optical fiber 20 can be easily inserted into fixing hole 18.

The present disclosure is not limited to the above-described embodiments and modifications, and various modifications can be made. For example, the embodiments and modifications described above may be combined with each other within a consistent range in accordance with the required object and effect. The configuration of the optical fiber holding component is not limited to the embodiments and modifications described above. For example, the plurality of injection holes 15 need not be connected to the plurality of through holes 11 one by one. For example, two injection holes 15 may be connected to one through hole 11. Further, each injection hole 15 is not necessarily connected to constant diameter portion 12*a* of through hole 11, but may be connected to increased-diameter portion 12*b* or fixing part 13. The shape of injection hole 15 when injection hole 15 is viewed in the Z direction is not necessarily a circular shape, and may be another shape such as an elliptical shape, a rectangular shape, or a polygonal shape.

The plurality of injection holes 15 do not need to extend linearly in the Z direction, and may extend in a direction inclined from the Z direction, or may have a part extending in another direction such as the X direction or the Y direction. The plurality of injection holes 15 do not need to be formed so as to extend from upper surface 10*c*, and may be formed so as to extend from lower surface 10*d*. Alternatively, the plurality of injection holes 15 may include an injection hole extending from upper surface 10*c* and an injection hole extending from lower surface 10*d*. For example, when optical fibers arranged in two rows are fixed to an optical fiber holding component, through holes are also arranged in two rows in correspondence with the arrangement of the optical fibers. In this case, the injection holes may be configured such that the injection holes extending from upper surface 10*c* are connected to the through holes in the first row, and the injection holes extending from lower surface 10*d* are connected to the through holes in the second row.

REFERENCE SIGNS LIST

1 optical coupling structure
2 optical connector
2A first optical connector
2B second optical connector
10, 10A, 10B, 10C, 10D, 10E, 10F, 10G, 110, 210 optical fiber holding component
10*a* front surface (first end surface)
10*b* back surface (second end surface)
10*c* upper surface (first side surface)
10*d* lower surface (second side surface)
10*e* side surface (third side surface)
10*f* side surface
10*g* fixing surface (fixing part)
10*h* connection surface
11, 11A, 11B, 11C through hole
11*a*, 11*b*, 15*a*, 17*a*, 18*a*, 31, 50*a* opening
12 holding part
12*a*, 15*b* constant diameter portion
12*b*, 15*c* increased-diameter portion
13 fixing part
14*a* core
14*b* cladding
14*c* coating
15,115 injection hole
15A first opening
15B second opening
17 recessed portion
17*b*, 19*a* bottom surface
18 fixing hole
19 groove
19A first groove
19B second groove
20 optical fiber
20*a* tip end surface
22 coating-removed portion
23 coated portion
25 optical fiber coupling structure
25A first optical fiber coupling structure
25B second optical fiber coupling structure
30 ferrule
30*a* front surface
30*b* back surface
32*a* inner surface (first inner surface)
32*b* inner surface (second inner surface)
32 accommodating hole
33 fiber holding hole
34 guide hole
35 window
40 guide pin
50 spacer
A adhesive
L central axis
P1, P2 position

The invention claimed is:

1. An optical fiber holding component configured to be disposed in a ferrule and hold a plurality of optical fibers, the optical fiber holding component comprising:

a first end surface and a second end surface that face each other in a first direction;

a plurality of through holes into each of which a corresponding one of the plurality of optical fibers is insertable, the plurality of through holes extending between the first end surface and the second end surface through the optical fiber holding component in the first direction and being arranged side by side in a second direction intersecting the first direction; and a plurality of injection holes into which an adhesive configured to bond the plurality of optical fibers to the plurality of through holes is injectable, the plurality of injection holes extending in a direction intersecting the plurality of through holes and each being individually connected to a corresponding one of the plurality of through holes.

2. The optical fiber holding component according to claim 1, wherein the optical fiber holding component is made of a resin capable of transmitting ultraviolet light.

3. The optical fiber holding component according to claim 1, wherein the optical fiber holding component is made of quartz glass capable of transmitting ultraviolet light.

4. The optical fiber holding component according to claim 1, wherein each of the plurality of through holes includes a holding part configured to hold a coating-removed portion that is a portion included in the corresponding one of the plurality of optical fibers and from which a coating has been removed, and wherein a fixing part configured to fix a coated portion at the fixing part is provided between the holding part and the second end surface in the first direction, the coated portion being another portion included in the corresponding one of the plurality of optical fibers and on which a coating remains.

5. The optical fiber holding component according to claim 4, wherein the holding part is configured to hold the coating-removed portion to be rotatable around a central axis of the coating-removed portion.

6. The optical fiber holding component according to claim 4, wherein the holding part includes a constant diameter portion capable of holding the coating-removed portion and having a constant inner diameter, and an increased-diameter portion positioned between the constant diameter portion and the fixing part in the first direction and having an inner diameter increasing from the constant diameter portion toward the fixing part in the first direction.

7. The optical fiber holding component according to claim 4, wherein the fixing part is a plurality of fixing holes into each of which the coated portion of a corresponding one of the plurality of optical fibers is individually insertable, and wherein the plurality of fixing holes are each individually connected to the holding part of a corresponding one of the plurality of through holes in the first direction.

8. The optical fiber holding component according to claim 4, wherein the fixing part is a fixing hole configured to collectively accommodate the coated portions of the plurality of optical fibers, and wherein the fixing hole is connected to the holding part of each of the plurality of through holes in the first direction.

9. The optical fiber holding component according to claim 4, the optical fiber holding component further comprising: a first side surface and a second side surface facing each other with the plurality of through holes interposed between the first side surface and the second side surface in a third direction intersecting both the first direction and the second direction, wherein the first side surface has a plurality of openings at each of which a corresponding one of the plurality of injection holes is open, wherein the fixing part is a fixing surface configured to allow the coated portion of each of the plurality of optical fibers to be placed on the fixing surface, and wherein the fixing surface is disposed at a position between the plurality of through holes and the second side surface in the third direction.

10. The optical fiber holding component according to claim 4, the optical fiber holding component further comprising: a first side surface intersecting a third direction intersecting both the first direction and the second direction, wherein each of the plurality of injection holes extends through the optical fiber holding component from the first side surface to the holding part in the third direction.

11. The optical fiber holding component according to claim 9, wherein each of the plurality of injection holes extends through the optical fiber holding component from the first side surface to the holding part in the third direction.

12. The optical fiber holding component according to claim 1, the optical fiber holding component further comprising: a first side surface intersecting a third direction intersecting both the first direction and the second direction, wherein the first side surface has a plurality of openings at each of which a corresponding one of the plurality of injection holes is open, wherein the plurality of openings include a first opening and a second opening adjacent to each other, the second opening being closest to the first opening, and wherein, in the first side surface, the second opening is formed at a position separated from the first opening.

13. The optical fiber holding component according to claim 9, wherein the first side surface has a plurality of openings at each of which a corresponding one of the plurality of injection holes is open, wherein the plurality of openings include a first opening and a second opening adjacent to each other, the second opening being closest to the first opening, and wherein, in the first side surface, the second opening is formed at a position separated from the first opening.

14. The optical fiber holding component according to claim 12, wherein the second opening is shifted from the first opening in the first direction.

15. The optical fiber holding component according to claim 12, wherein the second opening is shifted from the first opening in the third direction.

16. The optical fiber holding component according to claim 12, wherein the first side surface has a recessed portion between the first opening and the second opening.

17. The optical fiber holding component according to claim 12, wherein each of the plurality of injection holes includes an increased-diameter portion having an inner diameter increasing toward the first side surface in the third direction.

18. The optical fiber holding component according to claim 12, wherein the first side surface further has a first groove having the first opening at a bottom surface of the first groove and extending in the first direction, and a second groove having the second opening at a bottom surface of the second groove, the second opening being closest to the first opening, and extending in the first direction, the second groove and the first groove being arranged side by side to be separated from each other in the second direction.

19. An optical fiber coupling structure comprising:

the optical fiber holding component according to claim 1; and the plurality of optical fibers each fixed at a corresponding one of the plurality of through holes by a cured product of the adhesive.

20. The optical fiber coupling structure according to claim 19, wherein each of the plurality of optical fibers includes at least one core in a region shifted from a central axis.

21. An optical connector comprising:

the optical fiber coupling structure according to claim 19; and the ferrule configured to accommodate at least a portion of the optical fiber coupling structure, wherein the ferrule has an accommodating hole configured to accommodate the optical fiber holding component, and a plurality of fiber holding holes in communication with the accommodating hole in the first direction and each configured to hold a corresponding one of the plurality of optical fibers extending from the optical fiber holding component in the first direction, wherein the optical fiber holding component has a first side surface and a second side surface facing each other with the plurality of through holes interposed between the first side surface and the second side surface in a third direction intersecting both the first direction and the second direction, and a third side surface connecting the first side surface and the second side surface to each other and intersecting the second direction, and wherein the accommodating hole has a first inner surface in contact with the second side surface and a second inner surface in contact with the third side surface.

22. The optical connector according to claim 21, comprising:

a first optical fiber coupling structure and a second optical fiber coupling structure as the optical fiber coupling structure, wherein the first optical fiber coupling structure and the second optical fiber coupling structure are stacked on each other at the accommodating hole in the third direction.

23. An optical coupling structure comprising:

a first optical connector and a second optical connector as the optical connector according to claim 21, wherein the first optical connector and the second optical connector face each other with a gap interposed between the first optical connector and the second optical connector in the first direction.

* * * * *